US012561540B2

(12) United States Patent    (10) Patent No.:   US 12,561,540 B2
Simpson       (45) Date of Patent:   *Feb. 24, 2026

(54) SYSTEM AND METHOD FOR READING A COMPUTER READABLE CODE

(71) Applicant: United States Postal Service, Washington, DC (US)

(72) Inventor: Ryan J. Simpson, Vienna, VA (US)

(73) Assignee: United States Postal Service, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/943,503

(22) Filed: Nov. 11, 2024

(65) Prior Publication Data

US 2025/0068870 A1    Feb. 27, 2025

Related U.S. Application Data

(63) Continuation of application No. 18/468,158, filed on Sep. 15, 2023, now Pat. No. 12,141,649, which is a continuation of application No. 17/815,533, filed on Jul. 27, 2022, now Pat. No. 11,790,195, which is a continuation of application No. 17/174,736, filed on Feb. 12, 2021, now Pat. No. 11,461,571.

(60) Provisional application No. 62/976,188, filed on Feb. 13, 2020.

(51) Int. Cl.
*G06K 7/10*      (2006.01)
*G06K 7/14*      (2006.01)

(52) U.S. Cl.
CPC ....... *G06K 7/10722* (2013.01); *G06K 7/1413* (2013.01)

(58) Field of Classification Search
CPC ............ G06K 7/10722; G06K 7/1413; G06K 7/1478; G06K 7/14; G06K 7/10772
USPC ..... 235/462.41, 462.24, 462.11, 375, 462.07
See application file for complete search history.

(56) References Cited

U.S. PATENT DOCUMENTS

| | | | |
|---|---|---|---|
| 5,805,740 A | 9/1998 | Takagi et al. | |
| 2002/0009212 A1 | 1/2002 | Urano et al. | |
| 2004/0026511 A1 | 2/2004 | Cheung et al. | |
| 2015/0179395 A1 | 6/2015 | Yamamoto et al. | |

FOREIGN PATENT DOCUMENTS

JP      H07-107691 B2    6/1990

*Primary Examiner* — Edwyn Labaze
(74) *Attorney, Agent, or Firm* — Knobbe, Martens, Olson & Bear, LLP

(57) ABSTRACT

The present disclosure relates to a system for reading a barcode independently of image resolution or scale of a captured barcode image. In one embodiment, the system includes an optical sensor and a processor. The optical scanner can scan a barcode, including a plurality of bars and spaces, into a scanned image. The processor can convert the scanned image into binary data. The processor can also calculate numbers of ones (1s) between zeros (0s) in the binary data and determine widths of one of i) each of the bars and ii) each of the spaces based on the calculated numbers of ones (1s). The processor can further calculate numbers of zeros (0s) between ones (1s) in the binary data and determine widths of the other one of i) each of the bars and ii) each of the spaces based on the calculated numbers of zeros (0s).

20 Claims, 19 Drawing Sheets

200

212

222

224

(420) 12345 (91) 01123456789123456789

214

230

40

1000

1100

START

1110 — RECEIVE OR RETRIEVE BINARY DATA OF BARCODE

1120 — CALCULATE SUBTRACTED BARCODE DATA

1130 — DETERMINE LEADING EDGE OF SUBTRACTED BARCODE DATA

1140 — DETERMINE TRAILING EDGE OF SUBTRACTED BARCODE DATA

1150 — DETERMINE WIDTHS OF BARS

1160 — DETERMINE WIDTHS OF SPACES

END

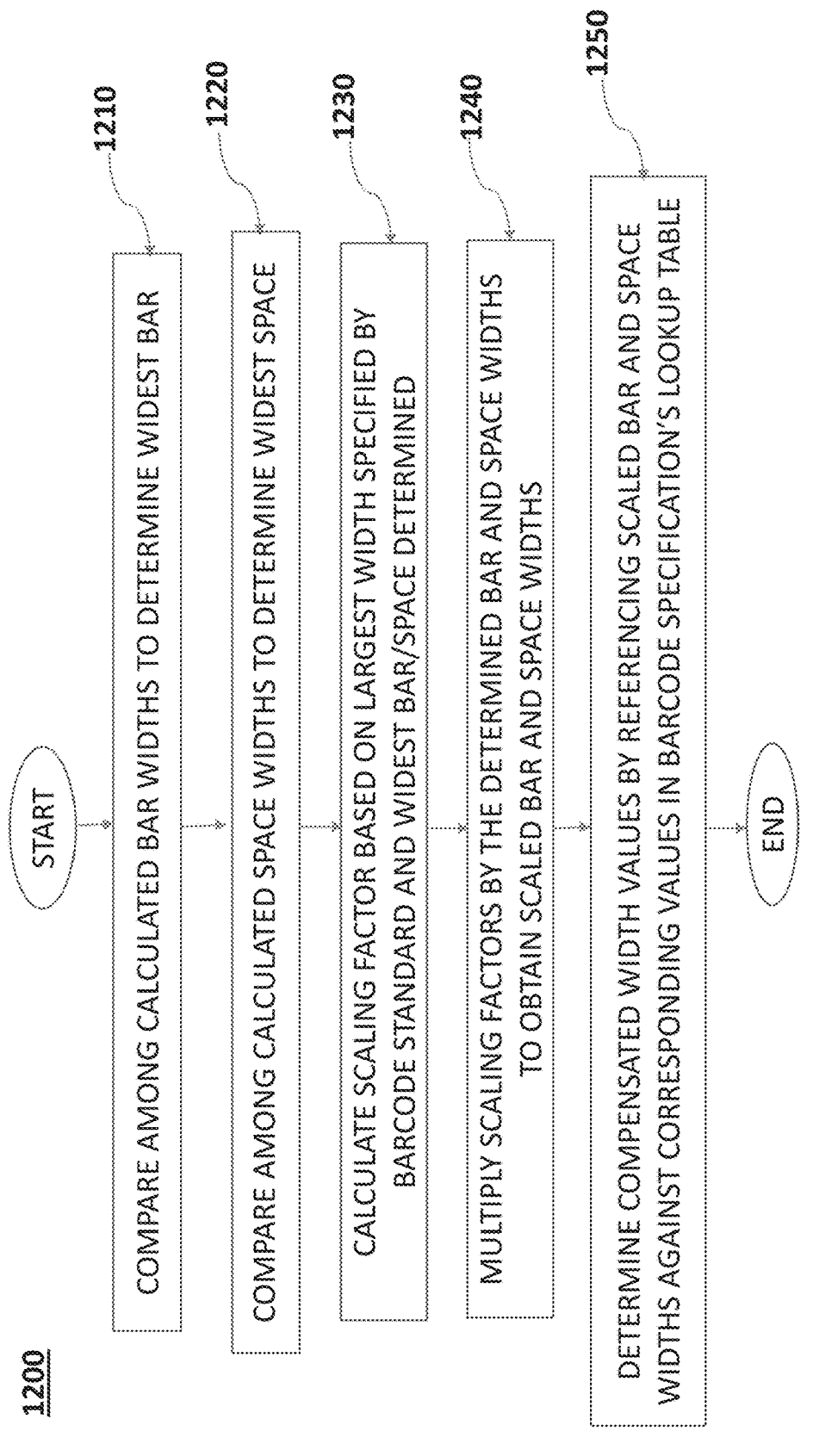

1200

1210 — COMPARE AMONG CALCULATED BAR WIDTHS TO DETERMINE WIDEST BAR

1220 — COMPARE AMONG CALCULATED SPACE WIDTHS TO DETERMINE WIDEST SPACE

1230 — CALCULATE SCALING FACTOR BASED ON LARGEST WIDTH SPECIFIED BY BARCODE STANDARD AND WIDEST BAR/SPACE DETERMINED

1240 — MULTIPLY SCALING FACTORS BY THE DETERMINED BAR AND SPACE WIDTHS TO OBTAIN SCALED BAR AND SPACE WIDTHS

1250 — DETERMINE COMPENSATED WIDTH VALUES BY REFERENCING SCALED BAR AND SPACE WIDTHS AGAINST CORRESPONDING VALUES IN BARCODE SPECIFICATION'S LOOKUP TABLE

FIG. 13

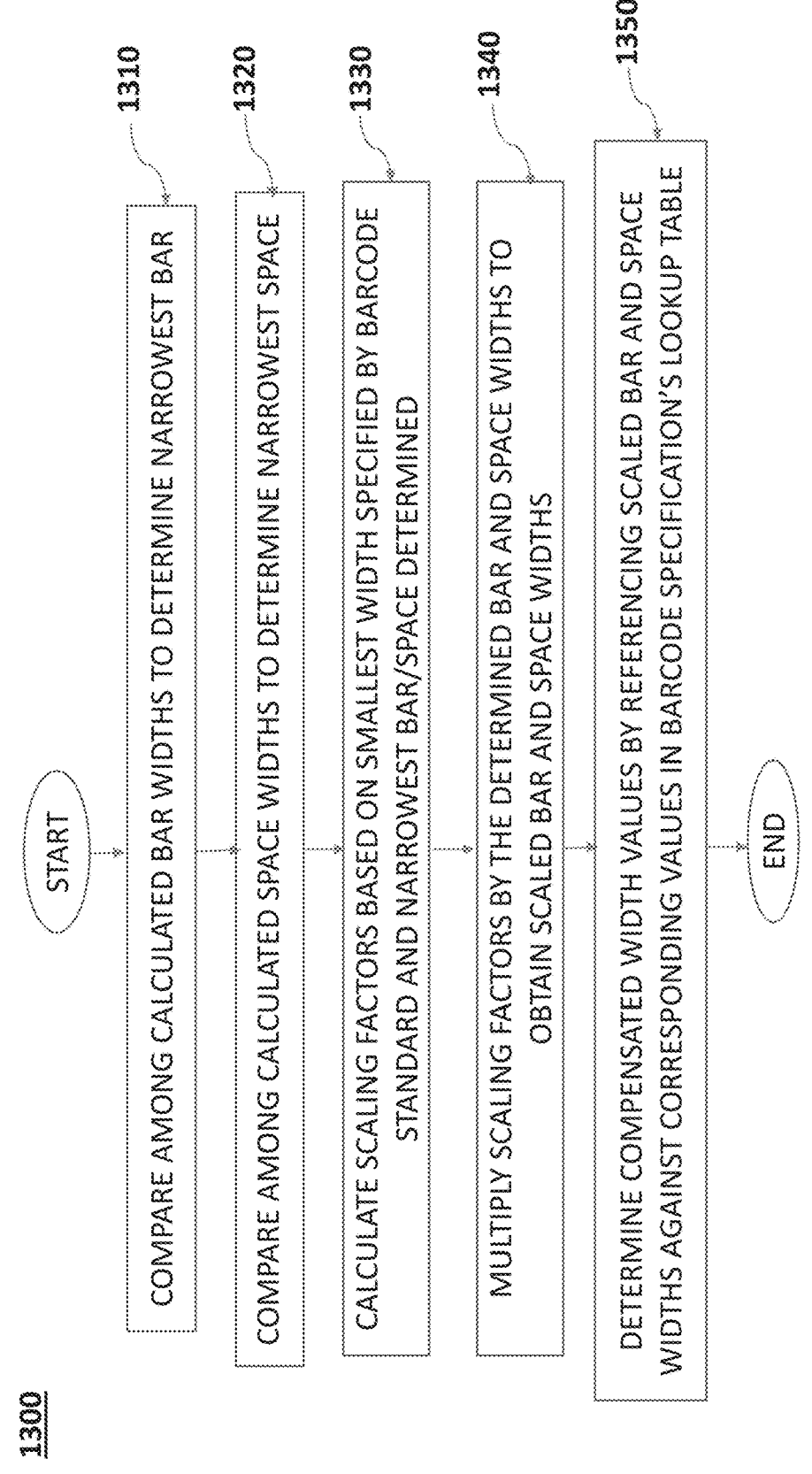

1300

1310 — COMPARE AMONG CALCULATED BAR WIDTHS TO DETERMINE NARROWEST BAR

1320 — COMPARE AMONG CALCULATED SPACE WIDTHS TO DETERMINE NARROWEST SPACE

1330 — CALCULATE SCALING FACTORS BASED ON SMALLEST WIDTH SPECIFIED BY BARCODE STANDARD AND NARROWEST BAR/SPACE DETERMINED

1340 — MULTIPLY SCALING FACTORS BY THE DETERMINED BAR AND SPACE WIDTHS TO OBTAIN SCALED BAR AND SPACE WIDTHS

1350 — DETERMINE COMPENSATED WIDTH VALUES BY REFERENCING SCALED BAR AND SPACE WIDTHS AGAINST CORRESPONDING VALUES IN BARCODE SPECIFICATION'S LOOKUP TABLE

START

END

FIG. 14

SYSTEM AND METHOD FOR READING A COMPUTER READABLE CODE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. patent application Ser. No. 18/468,158, filed Sep. 15, 2023, which is a continuation of U.S. patent application Ser. No. 17/815,533, filed Jul. 27, 2022, which is a continuation of U.S. patent application Ser. No. 17/174,736, filed Feb. 12, 2021, now U.S. Pat. No. 11,461,571, issued Oct. 4, 2022, which claims priority to and the benefit of Provisional Application No. 62/976,188 filed on Feb. 13, 2020 in the U.S. Patent and Trademark Office, the entire contents of which are incorporated herein by reference.

BACKGROUND

Technical Field

The described technology generally relates to image processing, and in particular to a system and method for reading a barcode independently of image resolution or scale of a captured barcode image.

Description of the Related Technology

Items, such as articles of mail (e.g., letters, flats, parcels, and the like), warehouse inventories, or packages are frequently received into a processing facility in volume, and must be sorted into particular groups to facilitate further processes such as, for example, delivery of the item to a specified destination. The particular groups can correspond to destinations or other information identified on the item. Processing items or articles can include reading and processing barcode data placed on the items or articles.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for image encryption through dynamic compression code words.

One aspect is a system for reading a barcode, the system comprising: a reader configured to read a barcode, positioned on a mail or parcel item, into a scanned image, the barcode including a plurality of bars and a plurality of spaces alternately disposed with respect to the plurality of bars; and a processor in data communication with the reader and configured to: convert the scanned image into binary data including a plurality of ones (1s) and a plurality of zeros (0s), wherein one (1) represents a pixel having a first characteristic and a zero (0) represents a pixel having a second characteristic; calculate numbers of ones (1s) disposed between zeros (0s) in the binary data; determine widths of one of i) each of the plurality of bars and ii) each of the plurality of spaces based on the calculated numbers of ones (1s); calculate numbers of zeros (0s) disposed between ones (1s) in the binary data; and determine widths of the other one of i) each of the plurality of bars and ii) each of the plurality of spaces based on the calculated numbers of zeros (0s).

In the above system, the processor is further configured to: compare among determined bar widths to identify a widest bar; compare among determined space widths to identify a widest space; calculate a bar width scaling factor based on a largest width specified by a predetermined barcode standard and the identified widest bar; calculate a space width scaling factor based on the largest width specified by the predetermined barcode standard and the identified widest space; multiply the calculated scaling factors by the determined bar and space widths to obtain scaled bar and space widths; and determine adjusted width values of the bars and spaces by referencing the scaled bar and space widths against corresponding values of a predetermined barcode specification stored in a memory.

Another aspect is a system for reading a barcode independently of image resolution or scale of a captured barcode image, the system comprising: a reader configured to read a barcode, positioned on a mail or parcel item, into a scanned barcode image, the barcode including a plurality of bars and a plurality of spaces alternately disposed with respect to the plurality of bars; and a processor in data communication with the reader and configured to: convert the scanned image into binary data (A) having a plurality of binary digits; subtract a lower digit binary value of the binary data (A) from an adjacent higher digit binary value of the binary data (A) throughout the plurality of binary digits so as to determine a subtracted set of the barcode data (B); select a first set of digit values $(C_1)$ having a positive digit difference from the subtracted set of the barcode data (B); select a second set of digit values $(C_2)$ having a negative digit difference from the subtracted set of the barcode data (B); and determine widths $(L_1)$ of the plurality of bars and widths $(L_2)$ of the plurality of spaces based on the first and second sets of digit values $(C_1, C_2)$.

In the above system, the plurality of binary digits of the binary data (A) comprise a plurality of ones (1s) and a plurality of zeros (0s), wherein one (1) represents a pixel having a first characteristic and zero (0) represents a pixel having a second characteristic, wherein the binary data (A) is represented by a matrix of A $(\hat{\imath}, \hat{\jmath})$, and wherein the subtracted set of the barcode data (B) comprises 1, 0, −1 and is determined using Equation 1 below: Equation 1: $B=A(2 \leq \hat{\jmath} \leq n_A) - A(1 \leq \hat{\jmath} \leq n_A - 1)$ where the dimension of B is $1 \times n_B$ and $n_B = n_A - 1$.

In the above system, the processor is further configured to select the first and second sets of digit values $(C_1, C_2)$ using Equation 2 below: Equation 2: $C_1 = \hat{\jmath}_B$ (B=1) with a dimension $n_{C1} = \Sigma(B=1)$ and $C_2 \hat{\jmath}_B$ (B=−1) with a dimension $n_{C2} = \Sigma(B=-1)$. In the above system, the processor is further configured to determine the widths $(L_1)$ of the plurality of bars using Equation 3 below: Equation 3: $L_1 = [C_2 (1), C_2 (2 \leq \hat{\jmath}_{C1} \leq n_{C1}) - C_1 (1 \leq \hat{\jmath}_{C2} \leq n_{C2}), n_A - C_1(n_{C1})]$. In the above system, the processor is further configured to determine the widths $(L_2)$ of the plurality of spaces using Equation 4 below: Equation 4: $L_2 = C_1 - C_2$.

In the above system, the processor is further configured to: compare among determined bar widths to determine a widest bar $([L_1])$; compare among determined space widths to determine a widest space $([L_2])$; calculate a bar width scaling factor based on a largest width (Ls) specified by a predetermined barcode standard and the widest bar $([L_1])$ determined; calculate a space width scaling factor based on the largest width (Ls) specified by the predetermined barcode standard and the determined widest space ($\lceil L_2 \rceil$); multiply the calculated space width scaling factor by the determined widest bar and space widths to obtain scaled bar widths ($S_1$) and scaled space widths ($S_2$); and determine adjusted width values of the bars and spaces by referencing the scaled bar and space widths ($S_1$, $S_2$) against corresponding values of a predetermined barcode specification stored in a memory.

In the above system, the processor is further configured to determine the scaled bar widths ($S_1$) using Equation 5 below: Equation 5: $S_1=(\lceil L_s \rceil / \lceil L_1 \rceil) \times L_1$ or $S_1=\{(\lceil L_s \rceil / \lceil L_1 \rceil)+(\lceil L_s \rceil / \lceil L_1 \rceil)\}/2 \times L_1$. In the above system, the processor is further configured to determine the scaled space widths ($S_2$) using Equation 6 below: Equation 6: $S_2=(\lceil L_s \rceil / \lceil L_2 \rceil) \times L_2$ or $S_2=\{(\lceil L_s \rceil / \lceil L_2 \rceil)+(\lceil L_s \rceil / \lceil L_2 \rceil)\}/2 \times L_2$. In the above system, the first characteristic comprises a first color and the second characteristic comprises a second color, different from the first color.

Another aspect is a method of reading a barcode, the method comprising: reading, at a reader, a barcode, positioned on an item, into a scanned barcode image, the barcode including a plurality of bars and a plurality of spaces alternately disposed with respect to the plurality of bars; converting the read image into binary data (A) having a plurality of binary digits; subtracting, at a processor in data communication with the reader, a lower digit binary value of the binary data (A) from an adjacent higher digit binary value of the binary data (A) throughout the plurality of binary digits so as to determine a subtracted set of the barcode data (B); selecting, at the processor, a first set of digit values ($C_1$) having a positive digit difference from the subtracted set of the barcode data (B); selecting, at the processor, a second set of digit values ($C_2$) having a negative digit difference from the subtracted set of the barcode data (B); and determining, at the processor, widths ($L_1$) of the plurality of bars and widths ($L_2$) of the plurality of spaces based on the first and second sets of binary digit values ($C_1$, $C_2$).

In the above method, the plurality of binary digits of the binary data (A) comprise a plurality of ones (1s) and a plurality of zeros (0s), wherein one (1) represents a pixel having a first characteristic and zero (0) represents a pixel having a second characteristic, wherein the binary data (A) is represented by a matrix of A ($\hat{i}$, $\hat{j}$), and wherein the subtracted set of the barcode data (B) comprises 1, 0, –1 and is determined using Equation 1 below: Equation 1: $B=A$ $(2 \leq \hat{j} \leq n_A)-A(1 \leq \hat{j} \leq n_A-1)$ where a dimension $B=1 \times n_B$ and $n_B=n_A-1$.

In the above method, selecting the first and second sets of digit values ($C_1$, $C_2$) is performed using Equation 2 below: Equation 2: $C_1=\hat{j}_B$ (B=1) with a dimension $n_{C1}=\Sigma$ (B=1) and $C_2=\hat{j}_B$ (B=–1) with a dimension $n_{C2}=\Sigma$ (B=–1). In the above method, determining the widths ($L_1$) of the plurality of bars is performed using Equation 3 below: Equation 3: $L_1=[C_2$ (1), $C_2$ $(2 \leq \hat{j}_{C1} \leq n_{C1})-C_1$ $(1 \leq \hat{j} \leq n_{C2})$, $n_A-C_1(n_{C1})]$. In the above method, determining the widths ($L_2$) of the plurality of spaces is performed using Equation 4 below: Equation 4: $L_2=C_1-C_2$.

The above method, further comprises: comparing, at the processor, among determined bar widths to identify a widest bar ($\lceil L_1 \rceil$); comparing, at the processor, among determined space widths to identify a widest space ($\lceil L_2 \rceil$); calculating, at the processor, a bar width scaling factor based on a largest width (Ls) specified by a predetermined barcode standard and the determined widest bar ($\lceil L_1 \rceil$); calculating, at the processor, a space width scaling factor based on the largest width (Ls) specified by the predetermined barcode standard and the determined widest space ($\lceil L_2 \rceil$); multiplying, at the processor, the calculated width scaling factors by the determined bar and space widths to obtain scaled bar widths ($S_1$) and scaled space widths ($S_2$); and determining, at the processor, adjusted width values of the bars and spaces by referencing the scaled bar and space widths ($S_1$, $S_2$) against corresponding values of a predetermined barcode specification.

In the above method, the scaled bar widths ($S_1$) are calculated using Equation 5 below: Equation 5: $S_1=(\lceil L_s \rceil / \lceil L_1 \rceil) \times L_1$ or $S_1=\{(\lceil L_s \rceil / \lceil L_1 \rceil)+(\lceil L_s \rceil / \lceil L_1 \rceil)\}/2 \times L_1$. In the above method, the scaled space widths ($S_2$) are calculated using Equation 6 below: Equation 6: $S_2=(\lceil L_s \rceil / \lceil L_2 \rceil) \times L_2$ or $S_2=\{(\lceil L_s \rceil / \lceil L_2 \rceil)+(\lceil L_s \rceil / \lceil L_2 \rceil)\}/2 \times L_2$.

The above method further comprises: comparing, at the processor, among calculated bar widths to determine a narrowest bar; comparing, at the processor, among calculated space widths to determine a narrowest space; calculating, at the processor, a bar width scaling factor based on a smallest width specified by a predetermined barcode standard and the narrowest bar determined; calculating, at the processor, a space width scaling factor based on the smallest width specified by the predetermined barcode standard and the narrowest space determined; multiplying, at the processor, the calculated width scaling factors by the determined bar and space widths to obtain scaled bar widths and scaled space widths; and determining, at the processor, adjusted width values of the bars and spaces by referencing the scaled bar and space widths against corresponding values of a predetermined barcode specification stored in a memory.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 13 is a process flow diagram of a method for scaling a barcode that has been read according to some embodiments.

FIG. 14 is another process flow diagram of a method for scaling a barcode that has been read according to some embodiments.

DETAILED DESCRIPTION

Figure 1:
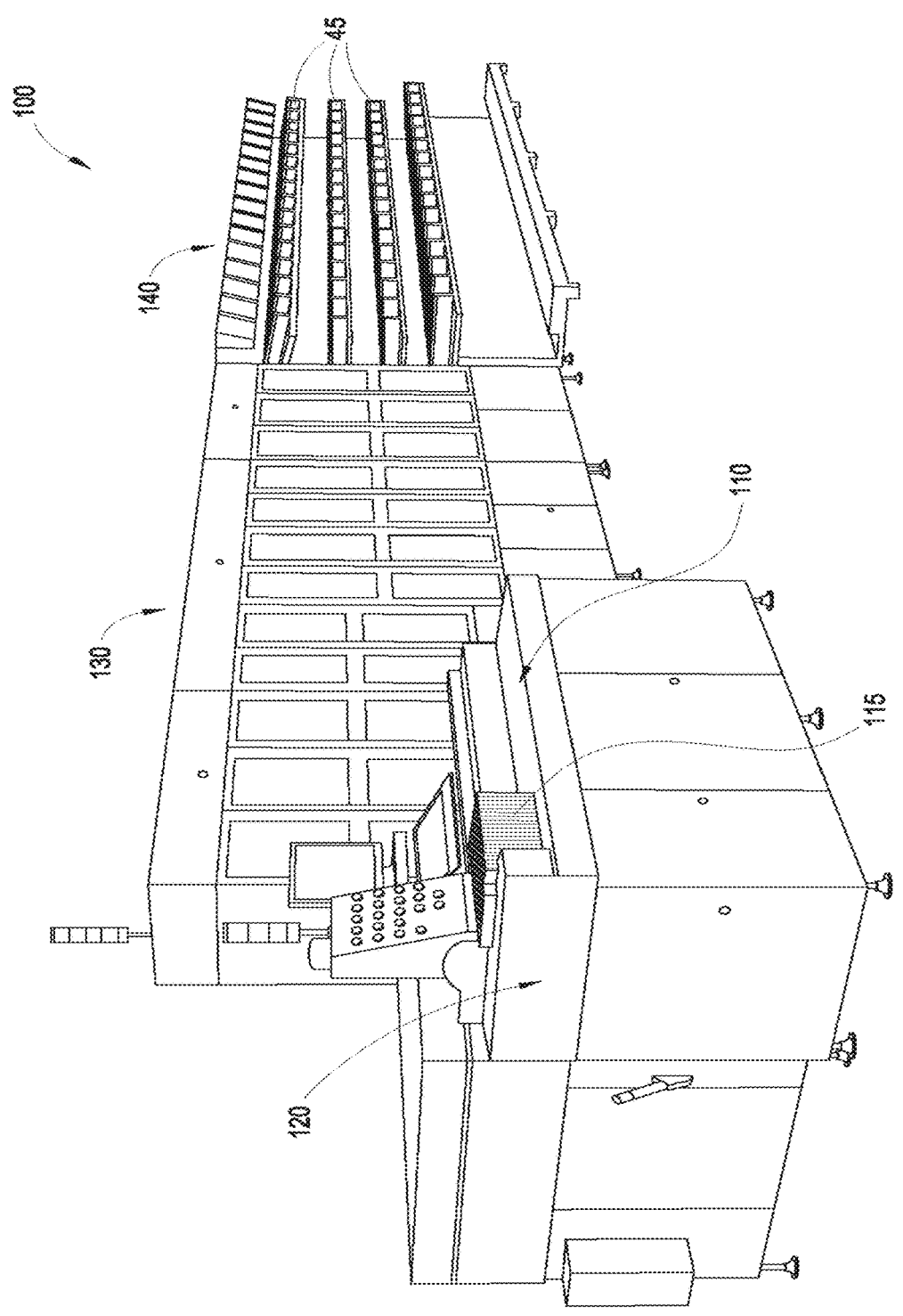
FIG. 1 illustrates an example of item processing equipment that may be used in an item processing facility.

Provided herein are various embodiments of systems and methods for image processing including, for example, a system and method for reading a barcode such as an IMpb independently of image resolution or scale of a captured barcode image. Various embodiments can significantly improve measurement accuracy of dimensions of a barcode such as widths of bars (e.g., black bars) and spaces (e.g., white spaces) of the barcode regardless of image resolution or scale of a captured barcode image so that the functionality of computing devices such as an item processing system is significantly improved. Such improved accuracy in reading barcode data can also enhance the encoding and decoding accuracy of barcode data.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used here, the term "item" or "items" may refer to flats, letters, parcels, residual mail, and the like. Although the present disclosure describes systems and devices for image processing related to articles of mail, such as letters and flats, it will be apparent to one of skill in the art that the disclosure presented herein is not limited thereto. For example, the described technology may have application in a variety of manufacturing, assembly, distribution, or sorting applications which include processing images including personal or sensitive information at high rates of speed and volume.

Where a plurality of images are captured, large volumes of data are created. This can be the case in various applications, such as recording video, photographing items, such as archives, and other applications where multiple images are being captured. A large amount of data is generated when handling items through processing systems. Handling items can include capturing one or more images of the item as it is being processed. For example, items, such as articles of mail (e.g., letters, flats, parcels, and the like), warehouse inventories, or packages are frequently received into a processing facility in bulk, and must be sorted into particular groups to facilitate further processes such as, for example, delivery of the item to a specified destination. Sorting items or articles can be done using imaging technologies. The ability to accurately process a given item may be limited by the effectiveness of the imaging technology to extract accurate information about each item. The extracted information may include personal information about the sender or receiver of the item such as name, address, account information, or other information that is provided in trust that public disclosure will be limited if not avoided altogether. Careful handling of the personal information includes careful handling of images taken of the item during processing. Mail delivery is one example of an industrial application that relies on sorting and processing large quantities of items. Others may include, but are not limited to, retail operations with large inventories and high daily sales, high volume component manufacturers, such as consumer goods, baggage sorting, and importing operations with high volumes of imports needing sorting and receiving daily.

Mail piece or parcel items are sorted and the information (e.g., addresses, types of items, barcode, etc.) about them are scanned in an item processing facility. Thus, hereinafter, the item processing facility will be described first. A processing facility can use automated processing equipment to sort items. An item processing facility may receive a very high volume of items, such as letters, flats, parcels, or other objects which must be sorted and/or sequenced for delivery. Sorting and/or sequencing may be accomplished using item processing equipment which can scan, read, or otherwise interpret a destination end point from each item processed. The destination end point may be encoded in a computer readable code, such as a barcode printed on or affixed to the item. In some embodiments, the destination end point may be read by taking an image of the item and performing an optical character recognition (OCR) process on the image, and determining the delivery end point from the OCR'd address. In some embodiments, the item processing equipment can apply a computer readable code that encodes the delivery end point and may print or spray the computer readable code onto the item. In some embodiments, the processing facility uses sorting/sequencing apparatuses which can process over about 30,000 items per hour.

FIG. 1 illustrates an example of item processing equipment 100 that may be used in item processing facilities. Although one type of item processing equipment is depicted in FIG. 1, the current disclosure is not limited thereto. The systems and methods described here can be applicable to the illustrated type and other types of item processing equipment without departing from the scope of the current disclosure. The item processing equipment 100 includes an intake system 110. The intake system 110 may be a counter, conveyor, or other receiving structure where a stack of items 115, such as letters, are brought to be fed into the item processing equipment 100. The intake system 110 may provide a surface or surfaces on which to place the stack of items 115 to stage the items for processing. The item processing equipment 100 has a scanning portion 120 that includes a scanner (e.g., 820 in FIG. 8) which scans or reads a computer readable code or performs OCR of an image of part or all of an item 115 in order to identify various characteristics of the item(s) 115, such as class of service, addressee, and/or delivery end point. The item processing equipment 100 includes a processor (not shown) configured to control the operation of the item processing equipment 100, including controlling the movement of items through the item processing equipment 100 via conveyor belts, pinch belts, and/or motors, controlling the scanning portion 120 to facilitate the intake, sorting, and sequencing the items 115. The processor is in communication with a memory (not shown) where information from the scanner is stored for further use. The memory can be part of the item processing equipment 100, or may be remote to the item processing equipment 100. The memory may be on a network with which the processor can communicate, and the memory may be shared by different components within a processing facility. The memory is configured to store the identity of each article processed, including information scanned, read, or interpreted from the letter, such as delivery end point, sender, class of service, postage, serial number, and the like. The memory is also configured to store the sequence of items in the item stream as they are scanned.

The item processing equipment 100 further includes a sorting portion 130. The sorting portion 130 may be a large storage and conveyor cabinet as shown, which has inside various components (not shown), for directing items 115 along particular pathways as the items 115 are sorted. The sorting portion 130 may be located adjacent to or otherwise near the intake system 110. In some embodiments, the items 115 may be moved or transported from the intake system 110 to the sorting portion 130 by an automated system including a series of pinch belts, vacuum belts, or other conveying mechanisms. As the items are moved or transported from the intake system 110 to the sorting portion 130, the items are read or scanned, and destinations identified for each individual item 115. The processor then operates a system of motors, conveyors, and pinch belts to direct the item to the output portion 140.

The output portion 140 may be a structural system having a plurality of stackers, receptacles, pockets, output areas, or bins 45 arrayed, in some embodiments, in vertically disposed rows. Each bin 45 is configured to receive one or more items 115 from the sorting portion 130. Each bin 45 can be assigned to a particular delivery route or to one or more stop groups.

Various embodiments involve reading and processing a barcode independently of image resolution or scale of a captured barcode image. Thus, hereinafter, some example barcodes will be described first. Various embodiments capture an entirety or a portion of an item containing a barcode that includes bars and spaces having different widths. Here, the bars mean lines (e.g., black lines) and the spaces mean empty spaces (e.g., white spaces) next to the bars and having a color different from that of the bars. Although various embodiments are described based on black bars and white spaces, the bars may have non-black colors and the spaces may have non-white colors, as long as the bars and spaces can be distinctively recognized by a computing device (e.g., optical scanner or controller).

A bar on a barcode has a vertically extending height and a horizontally extending width generally less than the height. Barcode bars may have different or same widths. For example, the widths of at least some bars disposed between neighboring spaces may be different from those of other bars (see, for example, FIGS. 2A-4B). Similarly, barcode spaces may have different or same widths. For example, the widths of at least some spaces disposed between neighboring bars may be different from those of other spaces (see, for example, FIGS. 2A-4B). The bars and spaces may be alternately arranged in the barcode. Each barcode may have a unique arrangement of bars and spaces so as to contain a unique set of information associated with an item itself, item delivery and/or data processing, etc.

Reading a captured barcode image requires accurate sensing of dimensions (e.g., widths) of bars and spaces. However, due to different sensor resolution and/or different image scale due to different distances between sensors and barcodes being sensed, captured and sensed dimensions may not accurately reflect the accurate relative dimensions of the black bars and white spaces in the barcode. For example, based on the resolution of the camera, interpreting an image of a barcode, for example, using OCR or other techniques, the number of pixels corresponding to the width of a black or white bar, will vary from camera to camera. Thus, to properly decode or read a barcode requires knowledge of the specifications and resolution of the camera. If the wrong resolution of the camera is used, the barcode reads will be errors. Thus, as described herein, it is advantageous to develop a method for reading barcodes that is agnostic about the resolution of the camera or device that captures the image of a barcode.

Various embodiments provide a system and method for accurately reading or recognizing dimensions of the bars and spaces in captured barcodes. Various embodiments further provide a system and method for compensating differences in image resolution or scale of a captured barcode image so that accurate measurement of bars and spaces can be achieved independently of image resolution or scale of a captured barcode image.

Although certain types of barcodes are described in this disclosure, various embodiments can be applied to other types of barcodes including, but not limited to, one-dimensional barcode types (e.g., UPC barcode, EAN barcode, Code39 barcode, Code 128 barcode, ITF barcode, Code 93 barcode, Codabar barcode, GS1databar barcode and MSI Plessey barcode) and two-dimensional barcodes (e.g., QR code, Datamatrix code, PDF417 code and Aztec code). Furthermore, although various embodiments are described with reference to an item barcode that is placed on a mail or an item for delivery, the present disclosure is not limited thereto and can be applied to non-mail barcodes (e.g., barcodes placed on products for sale, exhibit, or advertisement, etc.). Moreover, although various embodiments are described with reference to mail barcodes for USPS, the present disclosure is not limited thereto and can be used by other entities that ship products such as UPS, FedEx, Amazon, eBay, Uber, etc.

Figure 2A:
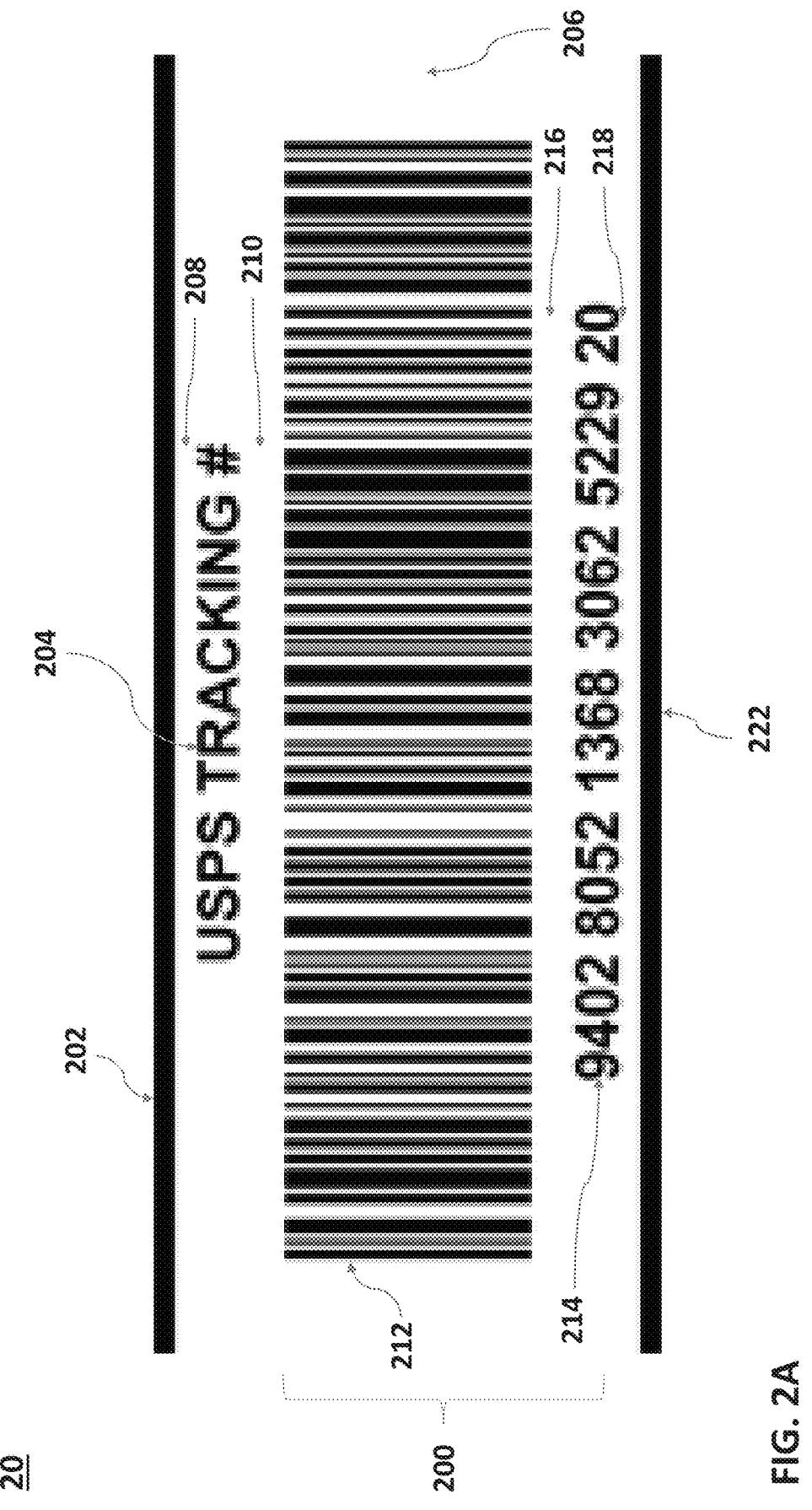
FIG. 2A illustrates an example of an item barcode according to some embodiments.

FIG. 2A illustrates an example of an item barcode 20 according to some embodiments. The barcode 20 may be an Intelligent Mail® package barcode (IMpb). The IMpb is a barcode that can be read by automated parcel processing equipment and scanning devices, and includes a data string that generally follows the GS1-128 specification. The IMpb may include a variable length format that is determined by the elements selected by the sender, and supply tracking and routing data for packages and extra service applications. The IMpb may be used on commercial packages, and on other items of customers requesting extra services.

The barcode 20 may include an upper identification bar 202, a service banner text 204, an intelligent barcode 200 and a lower identification bar 222. The intelligent barcode 200 may include a barcode portion 212 and a human-readable representation portion 214. The barcode portion 212 may include a series of unique bars (e.g., black bars) and unique spaces (e.g., white spaces or white bars) into which data is encoded.

In some embodiments, the barcode portion 212 may have a GS1-128 barcode format. In other embodiments, the barcode portion 212 may have a format other than the GS1-128 barcode format. The GS1-128 barcode provides a global standard for exchanging data between different companies. The GS1-128 barcode not only encodes the data, but it also provides a method of defining the meaning of the data.

The elements of the IMpb may have specific dimensions. For example, as shown in FIG. 2A, each of the upper and lower identification bars 202 and 222 may have a thickness in the range of, for example, about 0.031 inches to about 0.063 inches. An upper vertical clearance 208 between the service banner text 204 and the upper identification bar 202 may be, for example, at least about 0.031 inches. Similarly, a lower vertical clearance 218 between the human-readable representation portion 214 and the lower identification bar 222 may be, for example, at least about 0.031 inches. An upper vertical clearance 210 between the service banner text 204 and the top of the barcode portion 212 may be in the range of, for example, about 0.125 inches to about 0.250 inches. Similarly, a lower vertical clearance 216 between the bottom of the barcode portion 212 and the human-readable representation portion 214 may be in the range of, for example, about 0.125 inches to about 0.250 inches. A horizontal clearance 206 between one end of the barcode portion 212 and the corresponding end of each of the upper and lower identification bars 202 and 222 may be, for example, at least 10 times the X-dimension (e.g., about 0.250 inches). Each of the service banner text 204 and the human-readable representation number 214 may have a height in the range of, for example, about 0.090 to about 0.125 inches. The human readable representation portion 214 may not extend beyond the length of the identification bars 202 and 222. The above dimensions are merely examples and other dimensions are also possible. Some embodiments consider at least one of the above-described dimensions in reading and/or scaling the widths of the bars and spaces. Other embodiments may not consider the above-described dimensions in reading and/or scaling the widths of the bars and spaces. These embodiments may consider other factors such as relative dimensions of the bars and spaces and/or standardized barcode dimensions.

The barcode 20 shown in FIG. 2A is merely an example and may include other information and/or may have different configurations, formats, barcode types, encoding schemes, or dimensions. Furthermore some information or elements can be removed from the barcode 20. This applies to barcodes shown in FIGS. 3A-4B.

Figure 2B:
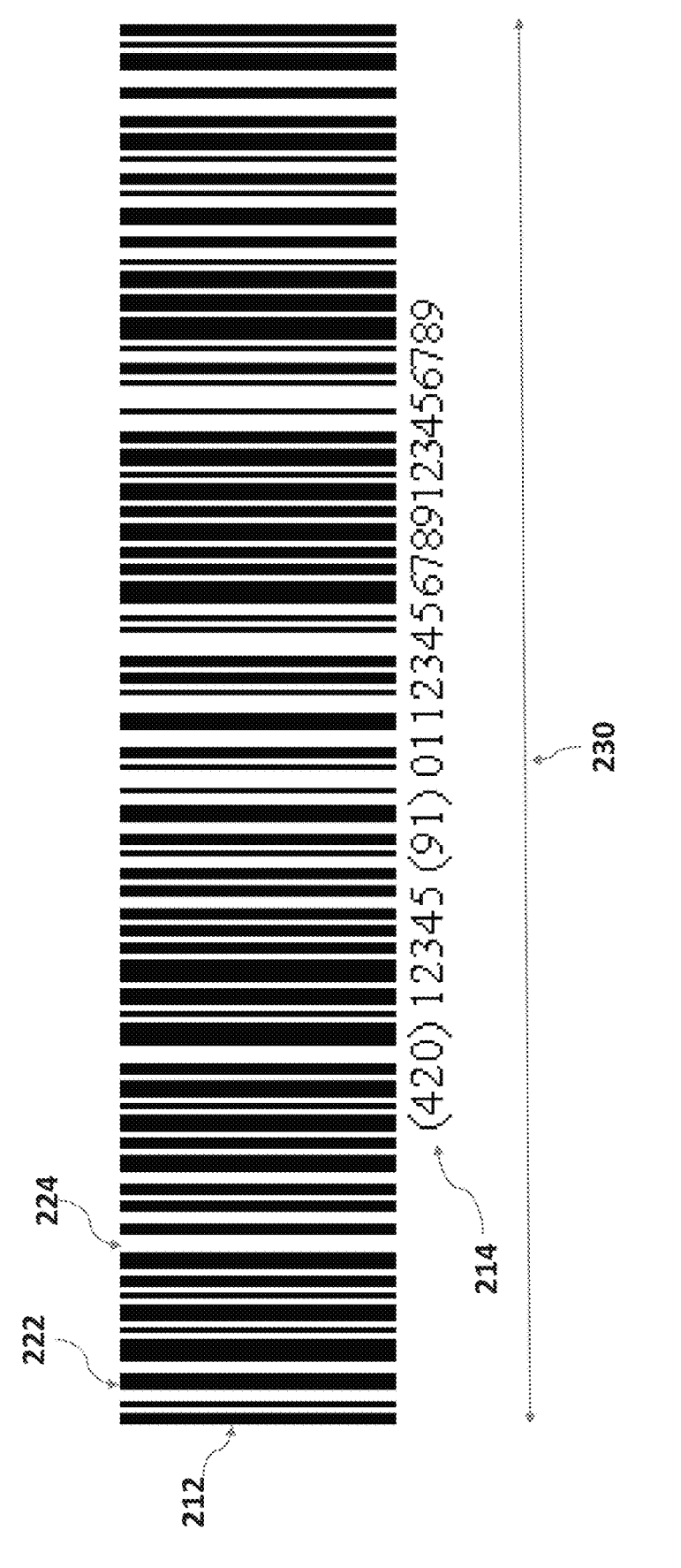
FIG. 2B illustrates an example of an intelligent barcode that can be used for an Intelligent Mail® package barcode (IMpb) according to some embodiments.

FIG. 2B illustrates an example of an intelligent barcode 200 that can be used for an item according to some embodiments. The intelligent barcode 200 may have a GS1-128 format, but could have another format without departing from the scope of this application. The barcode 200 includes black bars 222 and white spaces 224, and a human-readable representation portion 214. Each of the black bars 222 and the white spaces 224 may have a certain dimension including a width (hereinafter to be interchangeably used with "X-dimension") and a height (hereinafter to be interchangeably used with "barcode height"). For example, the width may be in the range of about 0.013 inches to about 0.021 inches. The height may be at least about 0.75 inches. The barcode 200 may have a certain length 230. The entire barcode length 230 may be a function of the number of characters encoded and the X-dimension used. Some embodiments may or may not consider the dimensions of the bars and spaces in reading and/or scaling the widths of the bars and spaces. These embodiments may consider other factors such as dimensions of at least one of the non-bar and non-space items, e.g., 202-210 and/or 214-218 shown in FIG. 2A. Other embodiments may consider the entire barcode length 230 in reading and/or scaling the widths of the bars and spaces. Still other embodiments may consider predetermined standardized dimensions in reading and/or scaling the widths of the bars and spaces.

Figure 3A:
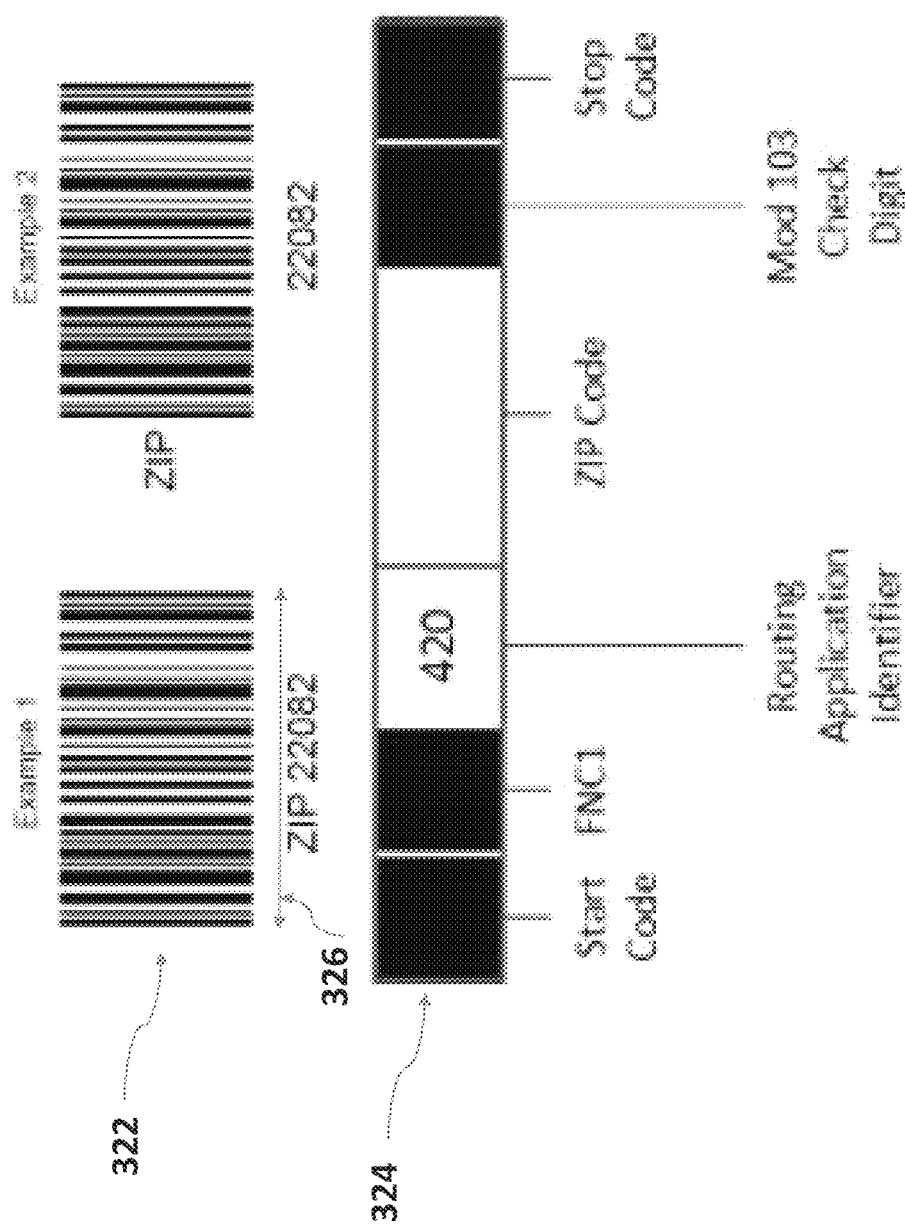
FIG. 3A illustrates another example of an item barcode according to some embodiments.

FIG. 3A illustrates another example of an item barcode 32 according to some embodiments. The barcode 32 may include a barcode portion 322. The barcode portion 322 can be defined according to a barcode data format portion 324. The barcode data format portion 324 can define portions of the barcode portion 322 as encoding, for example, a start code, a routing application identifier, a zip code, a check digit, a stop code, etc. In some embodiments, the barcode portion 322 may be separately provided on distribution items (e.g., mailpieces, parcels, etc.). The barcode portion 322 may have a postal routing GS1-128 barcode format that has been adopted by USPS, but may have another format as well. In some embodiments, the barcode portion 322 may have a fixed length 326. These embodiments may consider the entire barcode length 326 of the barcode portion 322 in reading and/or scaling the widths of the bars and spaces of the barcode portion 322. Other embodiments may consider predetermined standardized dimensions in reading and/or scaling the widths of the bars and spaces of the barcode portion 322.

Figure 3B:
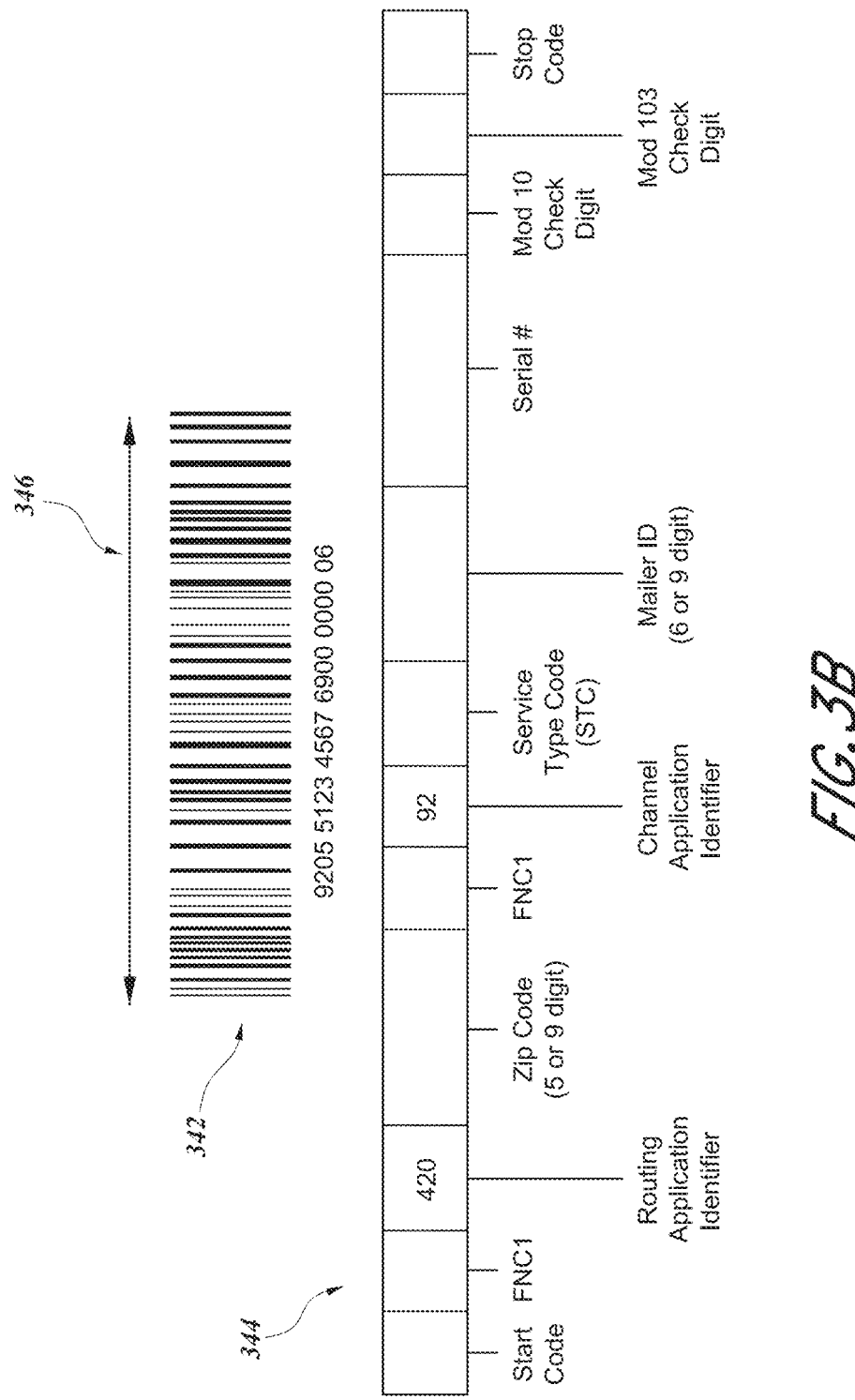
FIG. 3B illustrates another example of an item barcode according to some embodiments.

FIG. 3B illustrates another example of an item barcode 34 according to some embodiments. The barcode 34 has a barcode portion 342 which encodes data according to a barcode data format portion 344. The barcode data format portion 344 can define segments of the barcode portion 342 as corresponding to a start code, a routing identifier, a zip code, a channel application identifier, a service type code, a mailer ID (MID), a serial number, one or more check digits, a stop code, etc. The barcode portion 342 may have a confirmation services concatenated GS1-128 barcode format that has been adopted by USPS. In some embodiments, the barcode portion 342 may have a certain length 346. Some embodiments may consider the entire barcode length 346 of the barcode portion 342 in reading and/or scaling the widths of the bars and spaces of the barcode portion 342. Other embodiments may consider predetermined standardized dimensions in reading and/or scaling the widths of the bars and spaces of the barcode portion 342.

Figure 3C:
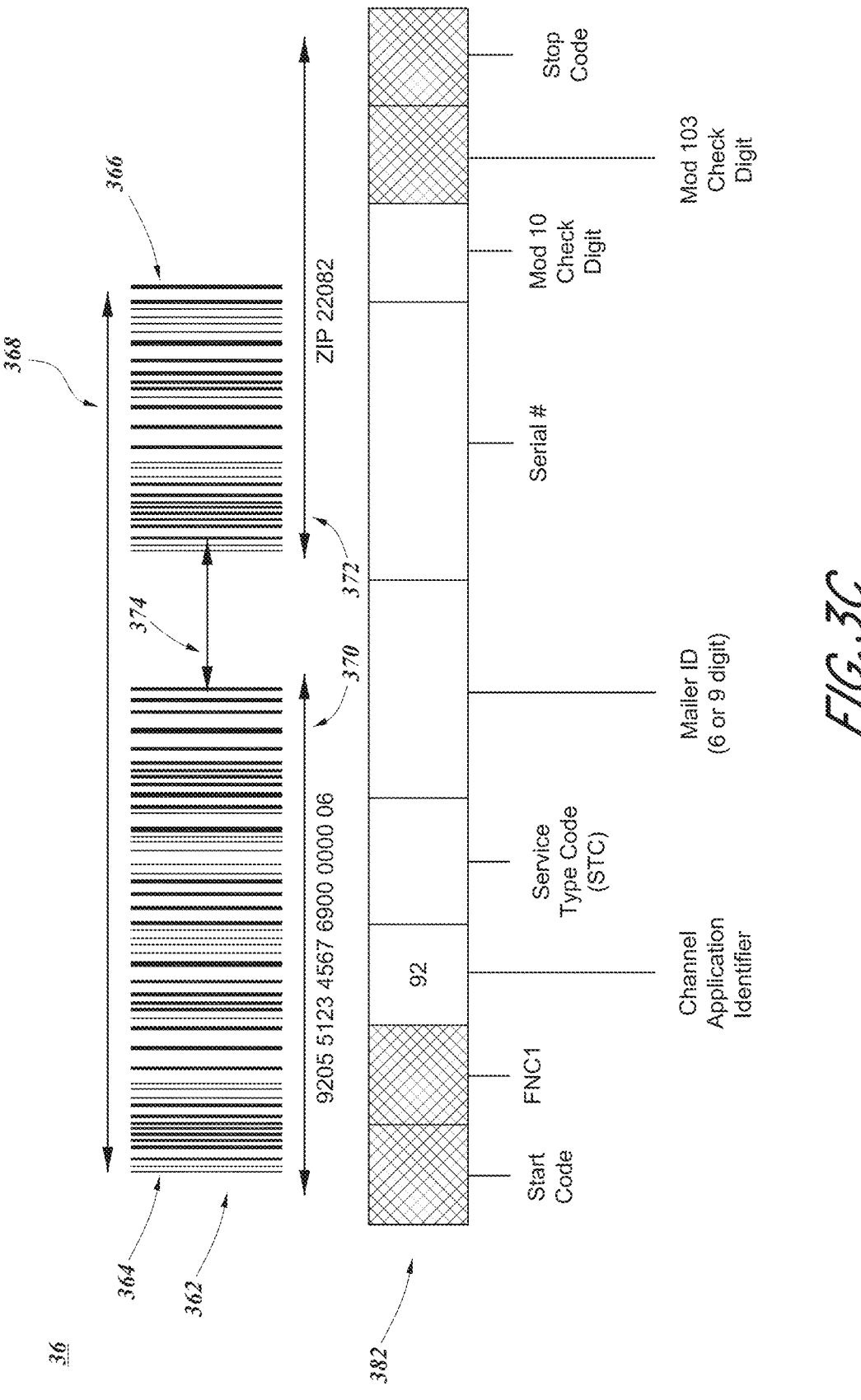
FIG. 3C illustrates another example of an item barcode according to some embodiments.

FIG. 3C illustrates another example of an item barcode 36 according to some embodiments. The barcode 36 may include a barcode portion 362 which is encoded according to a barcode data format portion 382 having fields as shown in FIG. 3C. The barcode portion 362 may be used to place both a postal routing barcode and a USPS Tracking barcode or signature confirmation barcode described above. The barcode portion 362 may have a confirmation services GS1-128 barcode format using a separate postal routing that has been adopted by USPS.

In some embodiments, the barcode portion 362 may have a certain length 368. These embodiments may consider the entire barcode length 368 of the barcode portion 362 in reading and/or scaling the widths of the bars and spaces of the barcode portion 362.

In some embodiments, the barcode portion 362 may include a first barcode portion 364 and a second barcode portion 366 that respectively have lengths 370 and 372. The first and second barcode portions 364 and 366 may be spaced apart by a middle space length 374. These embodiments may consider one or more of the lengths 370-374 in reading and/or scaling the widths of the bars and spaces of the barcode portion 362. Other embodiments may consider predetermined standardized dimensions in reading and/or scaling the widths of the bars and spaces of the barcode portion 362.

Figure 4A:
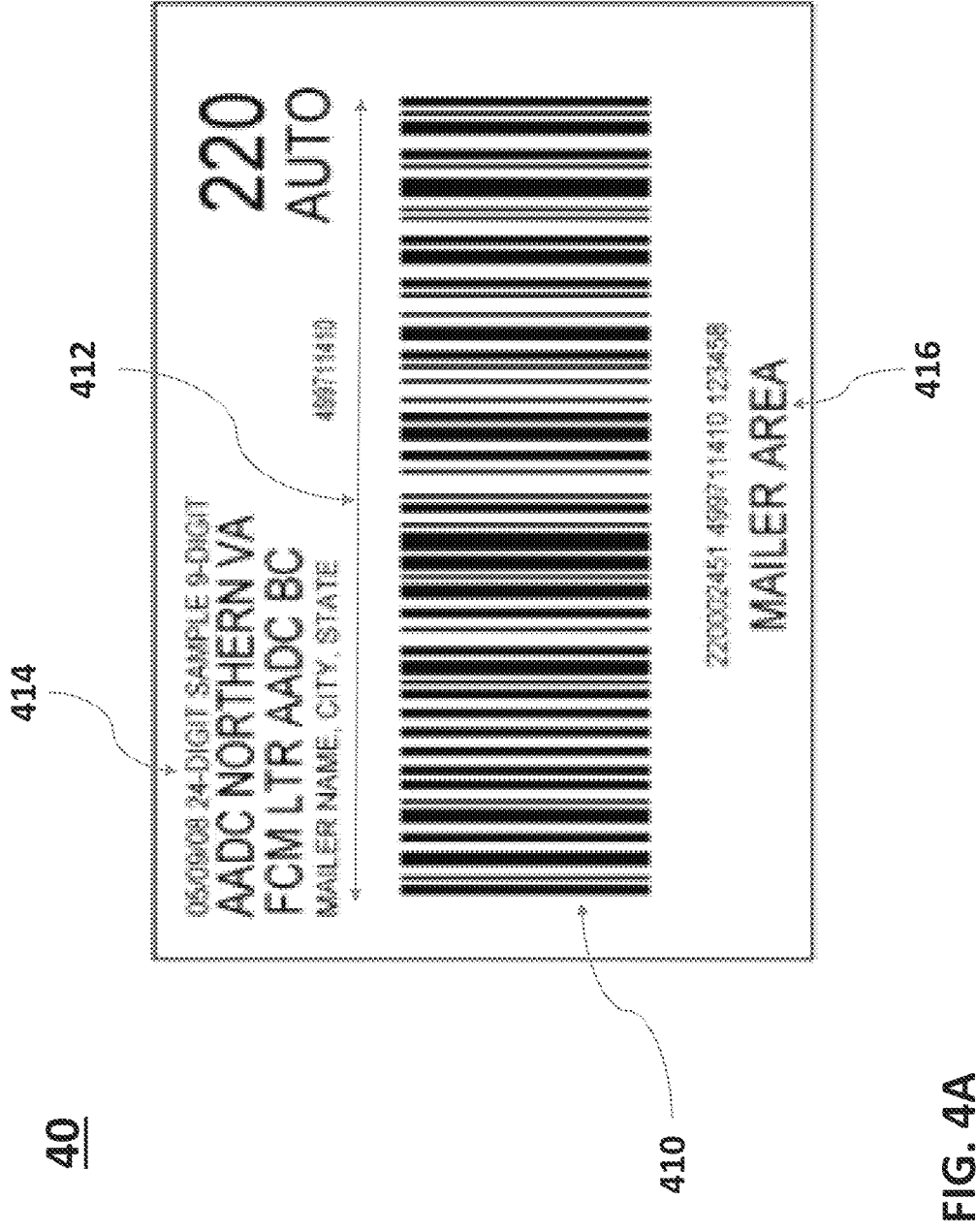
FIG. 4A illustrates another example of an item barcode according to some embodiments.

FIG. 4A illustrates another example of an item barcode 40 according to some embodiments. The barcode 40 may include a barcode portion 410, e.g., printed in the 24-digit format. The barcode portion 410 can be used on containers, items, and the like in the distribution network. For example, the barcode portion 410 can be used on trays, sacks, bins, pallets, and the like to uniquely identify each item and to identify a mailer or mail preparer for the item. The barcode 40 may be implemented with an Intelligent Mail® tray label available from USPS.

In some embodiments, the barcode portion 410 may have a certain length 412. These embodiments may consider the entire barcode length 412 of the barcode portion 410 in reading and/or scaling the widths of the bars and spaces of the barcode portion 410.

In other embodiments, the barcode 40 may include mailer sections 414 and 416, for example, on the upper and lower portions thereof. These embodiments may consider one or more of the lengths of the mailer sections 414 and 416 in reading and/or scaling the widths of the bars and spaces of the barcode portion 410. Other embodiments may consider predetermined standardized dimensions in reading and/or scaling the widths of the bars and spaces of the barcode portion 410.

Figure 4B:
FIG. 4B illustrates another example of an item barcode according to some embodiments.

FIG. 4B illustrates another example of an item barcode 42 according to some embodiments. The barcode 42 may include a barcode portion 420 that can be used to identify items in the distribution network such as pallets, rolling stock, containers, such as all-purpose containers, and the like. For example, the mail barcode 42 may be used to uniquely identify each container and may be scanned at induction points. The mail barcode 42 may be implemented with, for example, Intelligent Mail container label available from USPS.

In some embodiments, the barcode 42 may also include upper and lower identification bars 422 and 424, and the mailer section 426. These embodiments may consider one or more of the lengths of the identification bars 422 and 424 and the mailer section 426 in reading and/or scaling the widths of the bars and spaces of the barcode portion 420. Other embodiments may consider predetermined standardized dimensions in reading and/or scaling the widths of the bars and spaces of the barcode portion 420.

Figure 5:
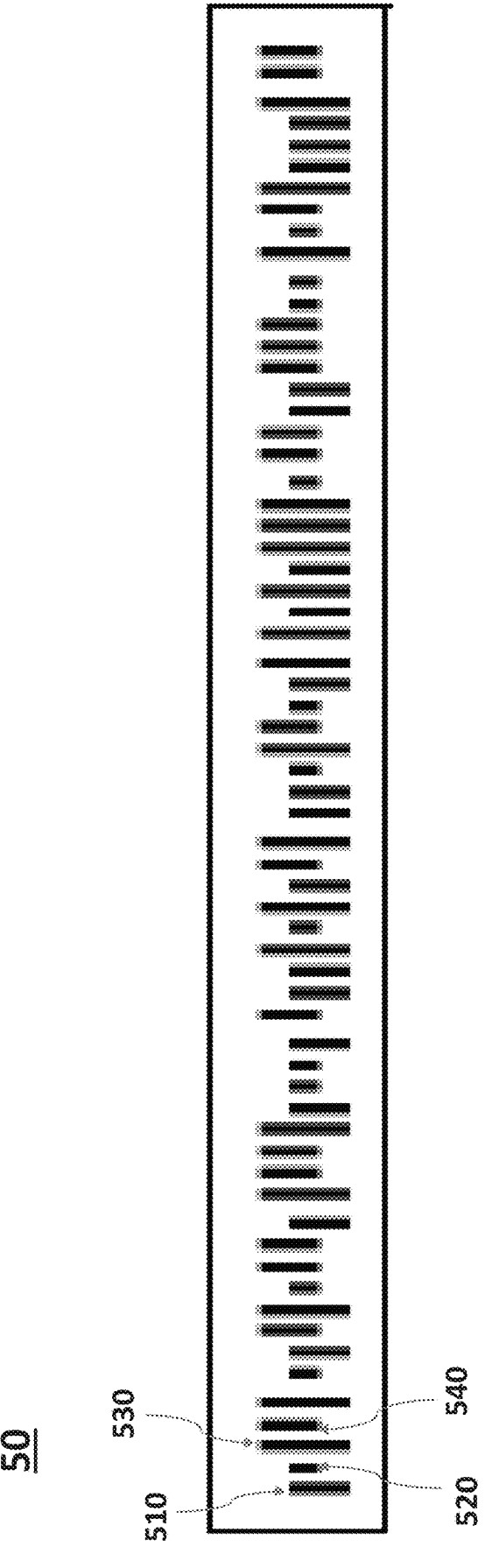
FIG. 5 illustrates another example of an intelligent barcode according to some embodiments.

FIG. 5 illustrates an intelligent barcode 50 according to some embodiments. The barcode 50 may be a four-state barcode, in which data is encoded using four types of bars. For example, the barcode 50 includes descender bars 510, tracker bars 520, full bars 530, and ascender bars 540. The barcode 50 may be designed for use in high-speed, automated mail sortation machines. The barcode 50 may be implemented with, for example, an intelligent barcode available from USPS.

In some embodiments, all of the descender bars 510, tracker bars 520, full bars 530, and ascender bars 540 may have the same width. The spaces between the bars 510-540 may have different widths. Some embodiments may measure or sense the heights of the bars 510-540 and/or the widths of the spaces between the bars 510-540. The barcode 50 can be an Intelligent Mail® barcode (IMb) and can have segments encoding various pieces of information, as desired.

Figure 6:
FIG. 6 illustrates an example image showing an item that contains a barcode according to some embodiments.

FIG. 6 illustrates an example image showing an item 60 that contains a barcode 610 according to some embodiments. The item 60 may be processed by the system shown in FIG. 1, 8 or 9. The barcode 610 may be one of the barcodes described with respect to FIGS. 2A-5.

The barcode 610 may have a certain length 612. Some embodiments may consider the entire barcode length 612 of the barcode 610 in reading and/or scaling the widths of the bars and spaces of the barcode 610. Other embodiments may capture mailer sections 620 and 630, and postage section 640 separately from or together with the barcode 610, and consider the dimensions of one or more of the mailer sections 620 and 630 and the postage section 640 in reading and/or scaling the widths of the bars and spaces of the barcode 610.

Figure 7:
FIG. 7 illustrates an example image showing another item that contains a barcode according to some embodiments.

FIG. 7 illustrates another example image showing another item 70 that contains barcodes 710 and 720 according to some embodiments. The item 70 may be processed by the system shown in FIG. 1, 8 or 9. Each of the barcodes 710 and 720 can be implemented with one or more of the barcodes described with respect to FIGS. 2A-5. Similarly to the above embodiments, parameters of one of more of several items such as the entire barcode length and dimension of mailer/postage section and other non-barcode sections, or dimensions of standardized parameters may be used in reading and/or scaling the widths of the bars and spaces of each of the barcodes 710 and 720.

Some embodiments provide systems and methods for reading a barcode independently of image resolution or scale of a captured barcode image to significantly improve measurement accuracy of widths of black bars and white spaces of an item barcode regardless of image resolution or scale of a captured barcode image.

Figure 8:
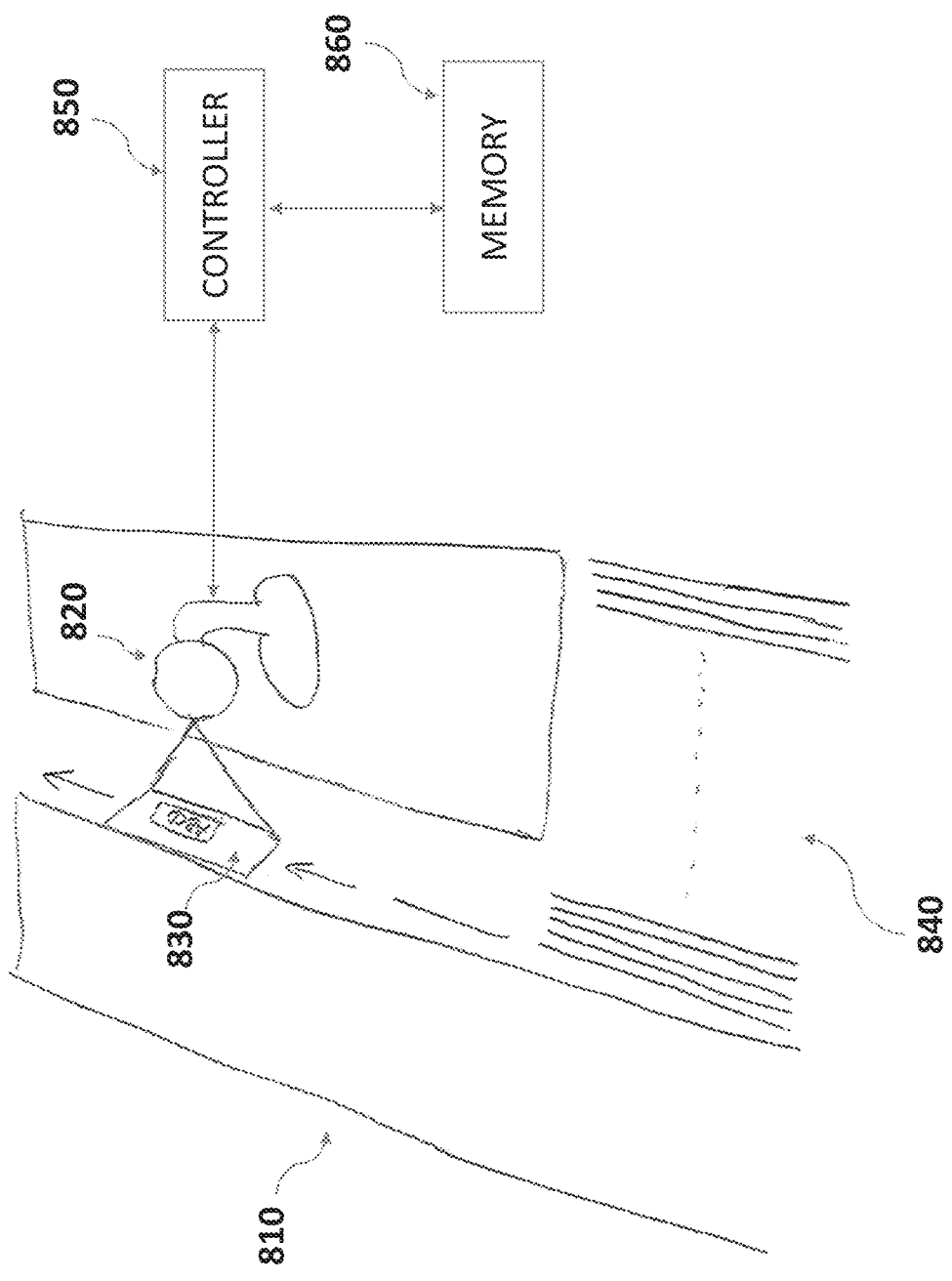
FIG. 8 illustrates an item processing system for processing items containing a barcode according to some embodiments.

FIG. 8 illustrates an item processing system 80 for processing items such as flat items containing one or more barcodes according to some embodiments. The item processing system 80 may be part of the item processing equipment 100 of FIG. 1 or can be separately provided, for example, to be disposed adjacent thereto. The item processing system 80 may include processing equipment 810, an optical scanner (an imaging device, an image capturing device or a reader) 820, a controller 850 and a memory 860. The item processing system 80 shown in FIG. 8 is merely an example processing system, and certain elements may be modified or removed, and/or other elements or equipment may be added. Although only one optical scanner is shown in FIG. 8, two or more optical scanners can be provided depending on the embodiment.

The processing equipment 810 may be an automated letter sorting machine used for letter-size mails, sorting parcels, etc. that have computer readable codes thereon. The processing equipment 810 may include a conveyor belt (not shown) that moves items from one location to another. Although FIG. 8 shows that the optical scanner 820 scans letters or flat items being conveyed by the processing equipment 810, the optical scanner 820 can also scan items such as parcels, residual mail, and the like.

The processing equipment 810 may process items 840 by conveying each proximate to or past an optical scanner 820 captures an image of an item 830 that is being conveyed. The optical scanner 820 may capture an entirety or a portion of one side of the item 830 facing the scanner 820. The optical scanner 820 may capture information relevant to processing and/or delivery including, but not limited to, names and addresses of senders and recipients, postage and barcodes, etc. The barcodes may include an IMpb or other barcodes described above.

In some embodiments, the captured image may include one or more of the images 20, 200, 32, 34, 36, 40, 42, 50, 60, and 70 shown in FIGS. 2A-7. In other embodiments, the captured image may include only barcode portions 212, 322, 342, 362, 410, 420, 610, 710 or 720 shown in FIGS. 2A-7.

The optical scanner 820 may continuously and separately capture images of items being transported in front of the scanner 820. In some embodiments, the captured images or digital data thereof may be stored in the memory 860 being in data communication with the controller 850. In other embodiments, the captured images or digital data thereof may be stored in a memory of the scanner 820 or a memory of the controller 850. The optical scanner 820 may be connected to the controller 850 either by wire or wirelessly. In other embodiments, the captured images or digital data thereof may be stored in a network memory such as a cloud or other device separately located from the elements 820, 850 and 860. The captured images or digital data thereof may also be transmitted to a receiving device via a communication network (wired or wireless). The digital data may include binary data. For example, "0" represents a white pixel and "1" represents a black pixel, or vice versa. Hereinafter, for the purpose of convenience, binary data will be described as an example of digital data.

In some embodiments, at least one of the scanner 820 or the controller 850 may read and process the dimensions of a barcode placed on an item. In other embodiments, at least one of the scanner 820 or the controller 850 may read and process the dimensions of a barcode independently of image resolution or scale of a captured barcode image to significantly improve measurement accuracy of dimensions of bars and spaces of the barcode.

Figure 9:
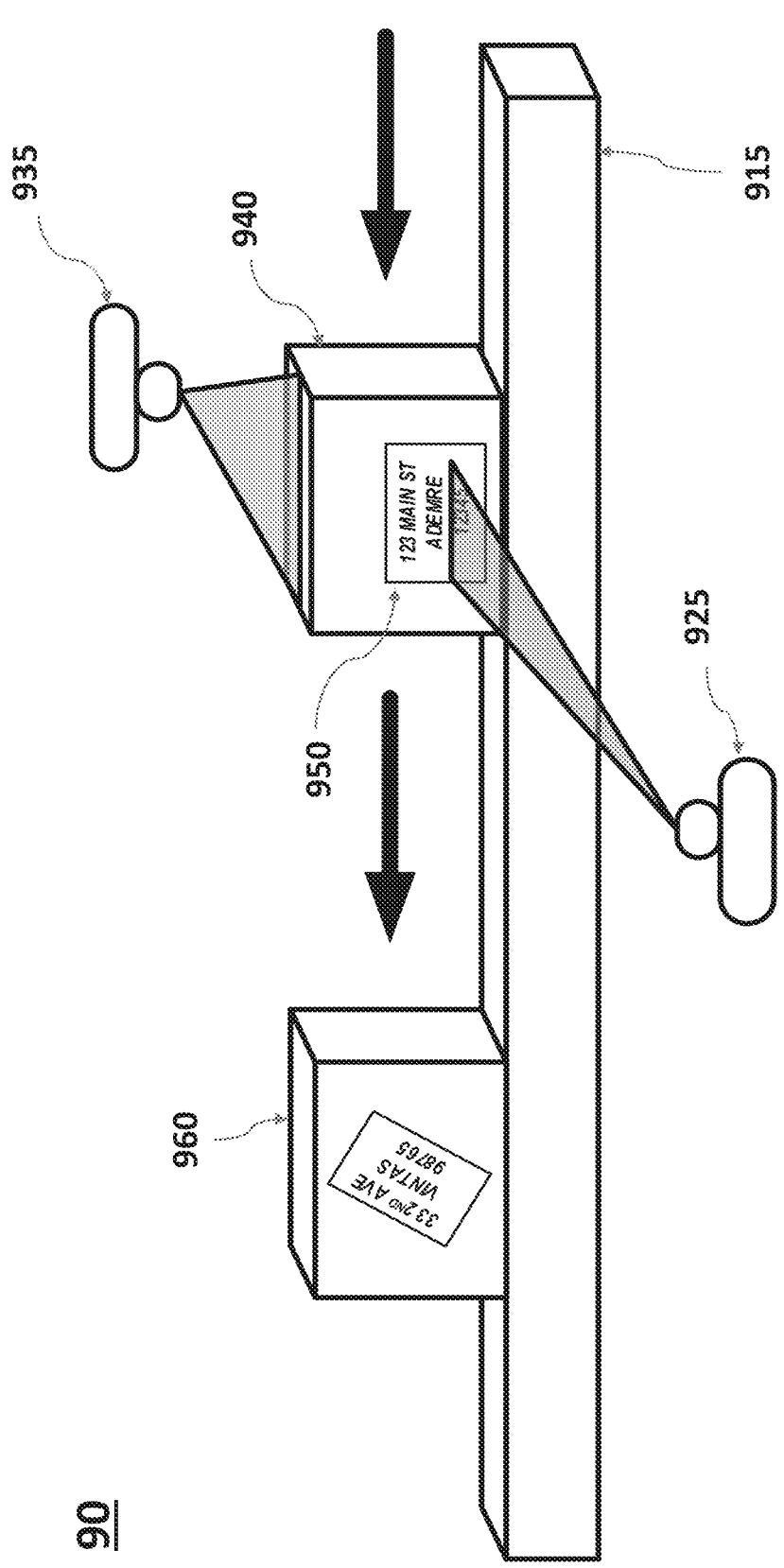
FIG. 9 illustrates another item processing system for processing items containing a barcode according to some embodiments.

FIG. 9 illustrates a simplified depiction of an item processing system 90 for processing items such as parcel items containing one or more barcodes according to some embodiments. The item processing system 90 may include a conveyor 915, a front scanner 925 and an upper scanner 935. In some embodiments, the item processing system 90 may have only a front scanner 925 or an upper scanner 935. The conveyor 915 conveys parcels including a parcel 940 and a parcel 960. The front scanner 925 may scan a label 950 containing a barcode and disposed on the front side of the parcel 940. The upper scanner 935 may scan a label (not shown) containing a barcode and disposed on the top surface of the parcel 940. For the purpose of convenience, a controller and a memory are omitted in FIG. 9.

Figure 10:
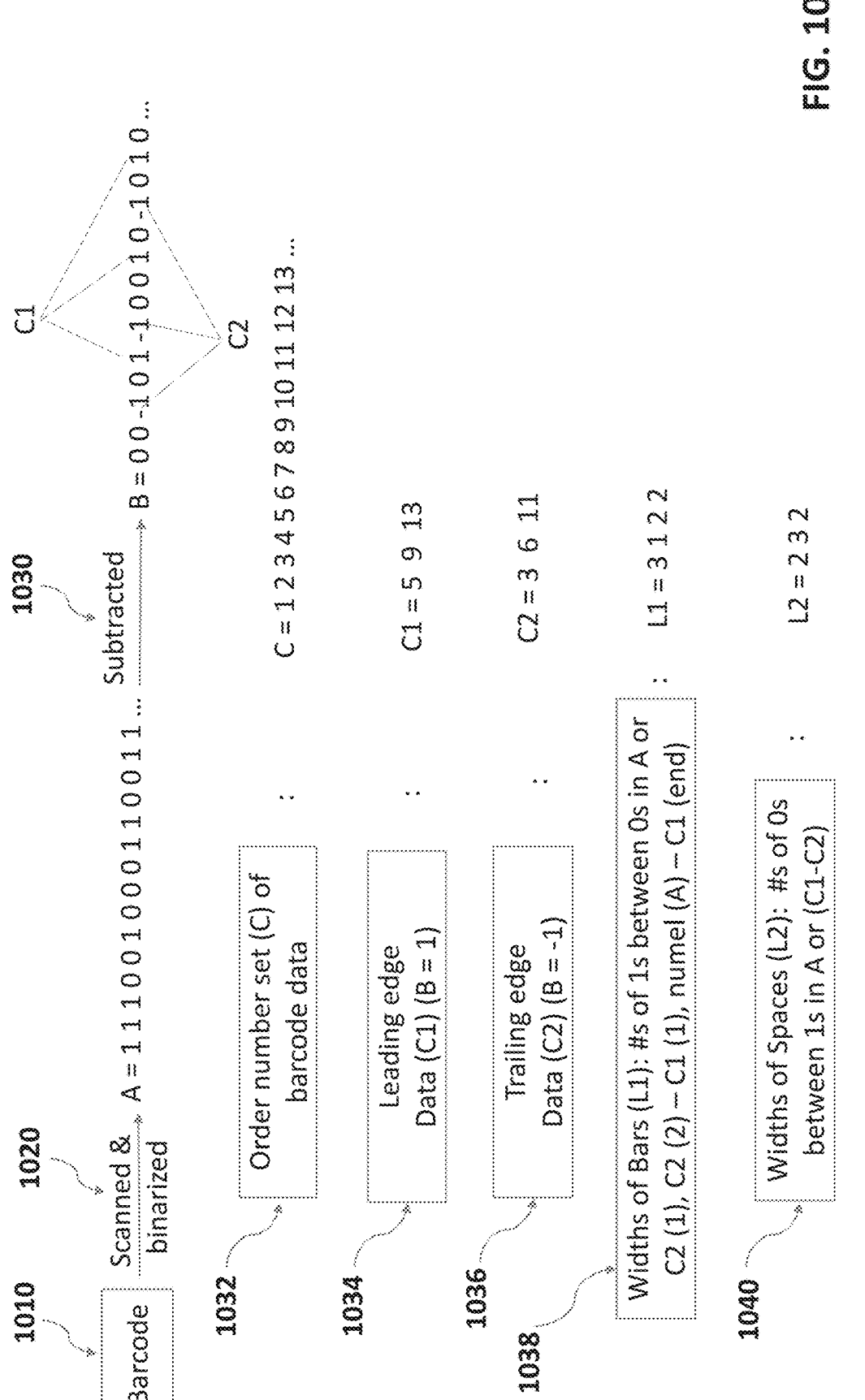
FIG. 10 is a conceptual diagram showing a barcode reading procedure according to some embodiments.

FIG. 10 is a conceptual diagram showing a barcode reading procedure according to some embodiments. In some embodiments, the procedure may be performed by at least one of the optical scanner (820/925/935) or the controller 850. In other embodiments, the procedure may be performed by another computing device separate from and/or in data communication with at least one of the optical scanner (820/925/935) or the controller 850.

Referring to FIG. 10, a barcode 1010 is scanned and binarized (1020). In some embodiments, the scanner 820 may scan the barcode 1010 and binarized the scanned barcode image. In other embodiments, the scanner 820 may scan the barcode 1010 and the controller 850 may binarize the scanned barcode image.

In some embodiments, leading and trailing zeros have been removed in the extracted barcode. In some embodiments, black pixels may be represented as ones and white pixels may be represented as zeros. In these embodiments, black bars can be represented as a series of ones. The numbers of ones in the series may be associated with the dimensions of the bars such as widths. For example, the more consecutive ones there are, the wider the black bars are, whereas the less consecutive ones there are, the narrower the black bars. Furthermore, in these embodiments, white spaces can be represented as a series of zeros. The numbers of zeros in the series may be associated with the dimensions of the spaces such as widths. For example, the more consecutive zeros there are, the wider the white spaces are, whereas the less consecutive zeros there are, the narrower the white spaces are.

In some embodiments, black pixels may be represented as zeros and white pixels may be represented as ones. In these embodiments, black bars can be represented as a series of zeros. The numbers of zeros in the series may be associated with the dimensions of the bars such as widths. For example, the more consecutive zeros there are, the wider the black bars are, whereas the less consecutive zeros there are, the narrower the black bars. In these embodiments, white spaces can be represented as a series of ones. Again, the quantity of ones in the series may be associated with the dimensions of the spaces such as widths. For example, the more consecutive ones there are, the wider the white spaces are, whereas the less consecutive ones there are, the narrower the white spaces.

The binarized barcode data may be represented as, for example, 1,1,1,0,0,1,0,0,0,1,1,0,0,1,1. For the purpose of convenience, it is assumed that white pixels are represented as zeros and black pixels are represented as ones in FIG. 10. Furthermore, all leading and trailing zeros are removed from the binarized barcode data (A). Referring to FIG. 10, the binarized barcode data (A) includes three consecutive ones, two consecutive zeros, a single one, three consecutive zeros, two consecutive ones, two consecutive zeros and two consecutive ones in this order. For convenience, the binarized barcode data (A) is shown up to the $15^{th}$ digit. In some embodiments, the binarized barcode data can include more than 15 digits. In this example, the barcode data (A) has a format in which the widest black bar (111), the second widest white space (00), the narrowest black bar (1), the widest white space (000), the second widest black bar (11), the second widest white space (00) and the second widest black bar (11) are arranged in this order. Again, these binary values are merely an example and other combination of binary values are also possible.

Adjacent binary values of the binarized barcode data (A) may be subtracted from each other (1030). For example, since the first and second binary values are respectively 1 and 1 in the binary data (A), the first difference (or first subtracted value) would be 0 (1−1=0). Furthermore, since the second and third binary values are respectively 1 and 1 in the binary data (A), the second difference (or second subtracted value) would be also 0 (1−1=0). Moreover, since the third and fourth binary values are respectively 1 and 0 in the binary data (A), the third difference (or third subtracted value) would be −1 (0−1=1). Repeating this for the remaining binary values in the binary data (A) would give a set of subtracted binary values (B), where B=0 0 −1 0 1 −1 0 0 1 0 −1 0 1 0. Note that since A has a 15$^{th}$ digit binary value, B has a 14$^{th}$ digit value.

In the subtracted data set or barcode data (B), 0 may mean that there is no change in pixel values or no changes in bar or space arrangement (same black bar or same white space arranged consecutively). Alternatively, 0 in the subtracted data set (B) may mean that the same color of pixels are consecutively arranged (e.g., two consecutive black pixels (1 1) or two consecutive white pixels (0, 0)). 1 in the subtracted data set (B) may mean that there is a change in pixel values from zero to one or a change in bar or space arrangement from the white space to the black bar. Alternatively, 1 in the subtracted data set (B) may mean that a white pixel (0) and a black pixel (1) are arranged in this order (e.g., 1−0=1). −1 in the subtracted data set (B) may mean that there is a change in pixel values from one to zero or a change in bar or space arrangement from the black bar to the white space. Alternatively, −1 in the subtracted data set (B) may mean that a black pixel (1) and a white pixel (0) are arranged in this order (e.g., 0−1=−1).

In some embodiments, C may be defined as an order number set indicating the order of the subtracted barcode data (B). For example, C can be 1 2 3 4 5 6 7 8 9 10 11 12 13 14 that respectively correspond to numbers of the subtracted data set (B)=0 0 −1 0 1 −1 0 0 1 0 −1 0 1 0. For example, the first two zeros (0 0) in the subtracted barcode data (B) correspond to the first and second in order from the beginning of the order number set 1032 (C). The first negative one (−1) in the subtracted barcode data (B) corresponds to the third in the order number set (C). Similarly, the first positive one (1) in the subtracted barcode data (B) corresponds to the fifth in the order number set (C). In these embodiments, a leading edge 1034 may be represented as C$_1$=5 9 13, and a trailing edge may be represented as C$_2$=3 6 11, where the numbers 5, 9, 13, represent the position in the sequence of binarized data of the pixel corresponding to the leading edge of a black or white bar. Here, the leading edge (C$_1$) means a list of binary values having B being 1 (i.e., fifth (5), ninth (9) and thirteenth (13) digit values in the subtracted barcode data (B)). Furthermore, the trailing edge 1036 (C$_2$) means a list of binary values having B being −1 (i.e., third (3), sixth (6) and eleventh (11) digit values in the difference data (B)).

In some embodiments, the widths of the bars may be determined by calculating the numbers of 1s disposed between 0s in the barcode data (A). For example, as shown in FIG. 10, since there are three 1s, one 1, two 1s and two 1s disposed between 0s in this order in the barcode data (A), the widths of the bars 1038 (L$_1$) may be represented as 3 1 2 2 (it is assumed that there are zeros before 111 for the purpose of convenience). These numbers (3 1 2 2) can be processed by a computing device such as the controller 850 to show the relative widths of the bars, for example, 3 being widest, 2 being second widest and 1 being narrowest.

In some embodiments, the widths of the spaces may be determined by calculating the numbers of 0s between is in the barcode data (A). For example, as shown in FIG. 10, since there are two 0s, three 0s and two 0s between is in this order in the barcode data (A), the widths of the spaces 1040 (L$_2$) can be represented as 2 3 2. These numbers (2 3 2) can be processed by a computing device such as the controller 850 to show the relative widths of the spaces, for example, 3 being wider than 2.

In another embodiment, the widths (L$_1$, L$_2$) of the bars and spaces may be obtained using a vector matrix and associated equations. A single row vector of an extracted barcode may be referred to as a matrix A with dimensions of using the traditional matrix indexing of A ($\hat{\imath}$, $\hat{\jmath}$). In some embodiments, the binarized barcode data (A) can have a format of a 1×15 matrix where A=[1,1,1,0,0,1,0,0,0,1,1,0,0, 1,1]. Again, for the purpose of convenience, it is assumed that white pixels are represented as zeros and black pixels are represented as ones. Furthermore, all leading and trailing zeros are removed from the barcode data (A), and the barcode data (A) is shortened to a 15$^{th}$ digit value.

The difference in values (or subtracted values) across the vector index can be obtained from the barcode data (A). Some embodiments use matrix arithmetic over the traditionally nested loop that can be highly optimized for some programming languages and even offer hardware acceleration.

In some embodiments, the difference vector or subtracted set of binary data (B) between adjacent binary values may be expressed in a vector form, for example, using Equation 1 below:

$$B = A(2 \le \hat{\jmath} \le n_A) - A(1 \le \hat{\jmath} \le n_A - 1) \qquad \text{Equation 1}$$

where the dimension of $B$ is $1 \times n_B$ and $n_B = n_A - 1$.

Again, since matrix A has a 1×15 matrix format, B has a 1×14 matrix format. Using Equation 1, the difference vector (B) can be calculated by using the relationship of B=A(2: end)−A(1:end−1) to obtain B (1×14)=0 0 −1 0 1 −1 0 0 1 0 −1 0 1 0. Here, A(2:end)−A(1:end−1) means that a lower digit binary value of the barcode data (A) is subtracted from an adjacent higher digit binary value of the barcode data (A) throughout all digits, for example, A2−A1 (1−1=0), A3−A2 (1−1=0), A4−A3 (0−1=−1), . . . , A14−A13 (1−0=1) and A15−A14 (1−1=0) to obtain the difference vector B (1×14)= 0 0 −1 0 1 −1 0 0 1 0 −1 0 1 0. As the input vector (A) is binary, the resulting calculation vector of B will be a set of values selected from elements {−1,0,1}. The subtracted vector (B) can provide a method of edge type detection to determine the index locations of positive or negative change as discussed above.

A leading edge data vector (C$_1$) and a trailing edge data vector (C$_2$), can be calculated using Equation 2 below.

$$C_1 = \hat{\jmath}_B(B = 1) \text{ with the dimension of } n_{C1} = \sum(B = 1) \text{ and} \qquad \text{Equation 2}$$
$$C_2 = \hat{\jmath}_B(B = -1) \text{ with the dimension of } n_{C2} = \sum(B = -1).$$

With n$_{C1}$=n$_{C2}$ provided that A ($\hat{\jmath}$=[1, n$_A$])=1 and the order vector of the subtracted vector (B) defined as C (1×14)=1 2 3 4 5 6 7 8 9 10 11 12 13 14, the leading edge vector can be obtained as C$_1$ (1×3)=5 9 13, and the trailing edge vector can be obtained as C$_2$ (1×3)=3 6 11.

Assuming again that the input vector (A) begins and ends with bars (i.e., all white spaces have been removed), the bar widths (L$_1$) may be calculated using Equation 3 below.

$$L_1 = \qquad \text{Equation 3}$$
$$[C_2(1), C_2(2 \le \hat{\jmath}_{C1} \le n_{C1}) - C_1(1 \le \hat{\jmath}_{C2} \le n_{C2}), n_A - C_1(n_{C1})].$$

$L_1$ can be simplified as [$C_2$ (1), $C_2$ (2)–$C_1$ (1), numel(A)–$C_1$ (end)]. $C_2$ (1) means the first digit value (3) in the trailing edge matrix vector ($C_2$) (3 6 11). $C_2$ (2)–$C_1$ (1) can be calculated by subtracting the first digit value (5) of the leading edge matrix vector ($C_1$=5 9 13) from the second digit value (6) in the trailing edge matrix vector ($C_2$=3 6 11) (6–5=1) and by subtracting the second digit value (9) in the leading edge matrix vector ($C_1$=5 9 13) from the third digit value (11) of the trailing edge matrix vector ($C_2$=3 6 11) (11–9=2). Since the first subtraction value is 1 and the second subtraction value is 2, $C_2$ (2)–$C_1$ (1) is 1 2. numel (A)–$C_1$ (end) can be calculated by subtracting the last digit value (13) of the leading edge matrix vector ($C_1$=5 9 13) from the total digits of the barcode data (A) (15) which is 2 (15–13=2). Combining the values calculated above gives the widths of the bars ($L_1$) as 3 1 2 2.

The space widths ($L_2$) may be calculated using Equation 4 below.

$$L_2 = C_1 - C_2. \qquad \text{Equation 4}$$

Since the leading edge matrix vector can be represented as $C_1$=(5, 9, 13) and the trailing edge matrix vector can be represented as $C_2$=(3, 6, 11), the widths of the spaces ($L_2$) can be obtained as the subtraction ($C_1$–$C_2$) which is 2 3 2 (5–3=2, 9–6=3, 13–11=2).

The system can then determine the length and position of bars and spaces of the read barcode which resulted in matrix A, by using $L_1$ and $L_2$. The system can then use the constructed barcode to determine the value encoded by the read barcode.

Depending on the embodiments, various barcode binarization methods can lead to black bars and/or white spaces being eroded (e.g., smaller) or dilated (e.g., bigger). For a given image, the dilation may appear to be consistent resulting in all bars or white spaces being dilated or eroded in a similar ratio. Some embodiments may take the resulting width calculations for both bars and spaces and comparing the widest bar and space widths $\lceil L_1 \rceil$ and $\lceil L_2 \rceil$ of the vector to the largest width $\lceil L_s \rceil$ specified by the barcode standard being decoded and using that scaling factor and multiplying it by the remaining width measurements. This can be done independently for both bar and space calculations. Additionally, a scaling factor may also be calculated using the minimum width specified for additional robustness.

In some embodiments, a bar width scaling factor can be expressed, for example, as a ratio of a largest width ($\lceil L_s \rceil$) specified by a predetermined barcode standard to the widest bar ($\lceil L_1 \rceil$) measured or as a ratio of a smallest width ($\lceil L_s \rceil$) specified by a predetermined barcode standard to the narrowest bar ($\lceil L_1 \rceil$) measured. Scaled bar widths ($S_1$) can be calculated using Equation 5 below.

$$S_1 = \left(\lceil L_s \rceil / \lceil L_1 \rceil\right) \times L_1 \text{ or } S_1 = \{(\lceil L_s \rceil / \lceil L_1 \rceil) + (\lfloor L_s \rfloor / \lfloor L_1 \rfloor)\}/2 \times L_1 \quad \text{Equation 5}$$

$$\left(\text{hereinafter, } \lceil L_s \rceil / \lceil L_1 \rceil \text{ or } \{(\lceil L_s \rceil / \lceil L_1 \rceil) + (\lfloor L_s \rfloor / \lfloor L_1 \rfloor)\}/2 \text{ will be}\right.$$

interchangeably used with "bar width scaling factor").

In some embodiments, a space width scaling factor can be expressed, for example, as a ratio of the largest standard width ($\lceil L_s \rceil$) to the widest space ($\lceil L_2 \rceil$) measured or as a ratio of a smallest width ($\lfloor L_s \rfloor$) specified by a predetermined barcode standard to the narrowest space ($\lfloor L_2 \rfloor$) measured. In some embodiments, scaled space widths ($S_2$) can be calculated using Equation 6 below.

$$S_2 = \left(\lceil L_s \rceil / \lceil L_2 \rceil\right) \times L_2 \text{ or } S_2 = \{(\lceil L_s \rceil / \lceil L_2 \rceil) + (\lfloor L_s \rfloor / \lfloor L_2 \rfloor)\}/2 \times L_2 \quad \text{Equation 6}$$

$$\left(\text{hereinafter, } \lceil L_s \rceil / \lceil L_2 \rceil \text{ or } \{(\lceil L_s \rceil / \lceil L_2 \rceil) + (\lfloor L_s \rfloor / \lfloor L_2 \rfloor)\}/2 \text{ will be}\right.$$

interchangeably used with "space width scaling factor").

In some embodiments where the largest standard width $\lceil L_s \rceil$ is 6, since the widest bar $\lceil L_1 \rceil$ is 3 (3 1 2 2), scaled bar widths ($S_1$) can be calculated using Equation 5, i.e., $S_1$= ($\lceil L_s \rceil / \text{ffiL}_1 \rceil$)×$L_1$=(6/3)×(3 1 2 2)=(6 2 4 4). In these embodiments, scaled space widths ($S_2$) can be calculated using Equation 6, i.e., $S_2$=($\lceil L_s \rceil / \lceil L_2 \rceil$)×$L_2$=(6/3)×(2 3 2)=(4 6 4). In other embodiments where the largest standard width $\lceil L_s \rceil$ is 1, since the widest bar $\lceil L_1 \rceil$ is 3 (3 1 2 2), scaled bar widths ($S_1$) can be calculated using Equation 5, i.e., $S_1$=($\lceil L_s \rceil / \lceil L_1 \rceil$)×$L_1$=(⅓)×(3 1 2 2)=(1 ⅓ ⅔ ⅔). In these embodiments, scaled space widths ($S_2$) can be calculated using Equation 6, i.e., $S_2$=($\lceil L_s \rceil / \lceil L_2 \rceil$)×$L_2$=(⅓)×(2 3 2)=(⅔ 1 ⅔).

In some embodiments, the scaled bar widths ($S_1$) and the scaled space widths ($S_2$) may be referenced against the desired barcode specification's lookup table to calculate corresponding alpha-numeric values (e.g., adjusted or compensated values of the measured bars and spaces).

Although various embodiments use a ratio of a largest standard width to a widest bar/space measured as bar/space scaling factors ($\lceil L_s \rceil / \lceil L_1 \rceil$, $\lceil L_s \rceil / \lceil L_2 \rceil$, {($\lceil L_s \rceil / \lceil L_1 \rceil$)+($\lfloor L_s \rfloor / \lfloor L_1 \rfloor$)}/2, {($\lceil L_s \rceil / \lceil L_2 \rceil$))+($\lfloor L_s \rfloor / \lfloor L_2 \rfloor$)}/2), many other scaling factors can also be used.

In other embodiments, various dimensions of barcode elements discussed above with respect to FIGS. 2A-7 can also be used to calculate bar/space scaling factors. In some embodiments, for example when analyzing a 4-state barcode, the processes above can be performed on a plurality of pixels or binary data in rows of an image of the barcode to identify where the rising, falling, short, and tall bars are located. In some embodiments, a process similar to that described above can be performed using columns of pixel data to identify the length of bars in a 4-state barcode. To identify the length of the barcode, the above algorithms can be adapted to identify the leading edge by determining where a long string of pixels of one color, for example, 0s in the binary data, transition to a shorter string of pixels of another color, for example, 0s in the binary data. The trailing edge can be determined by identifying where a string of pixels of one color, for example is in the binary data, transition to a longer string of pixels of another color, for example, 0s in the binary data. The length of the shorter string of pixels, or is in the binary data, can be the length of the bar in a 4-state bar code. In this embodiment the process or algorithm may not identify multiple bars in line of binary data, but will identify only the length of a single bar in a column of pixels. The algorithm can then use data from other adjacent or nearby columns of pixel data to interpret the barcode in the order of the bars.

In some embodiments, the processes of FIG. 10 can be performed to identify the number of bars in a 4-state barcode, and then the columns of pixel data can be evaluated using similar processes to identify the height of the bars in a 4-state barcode.

Figure 11:
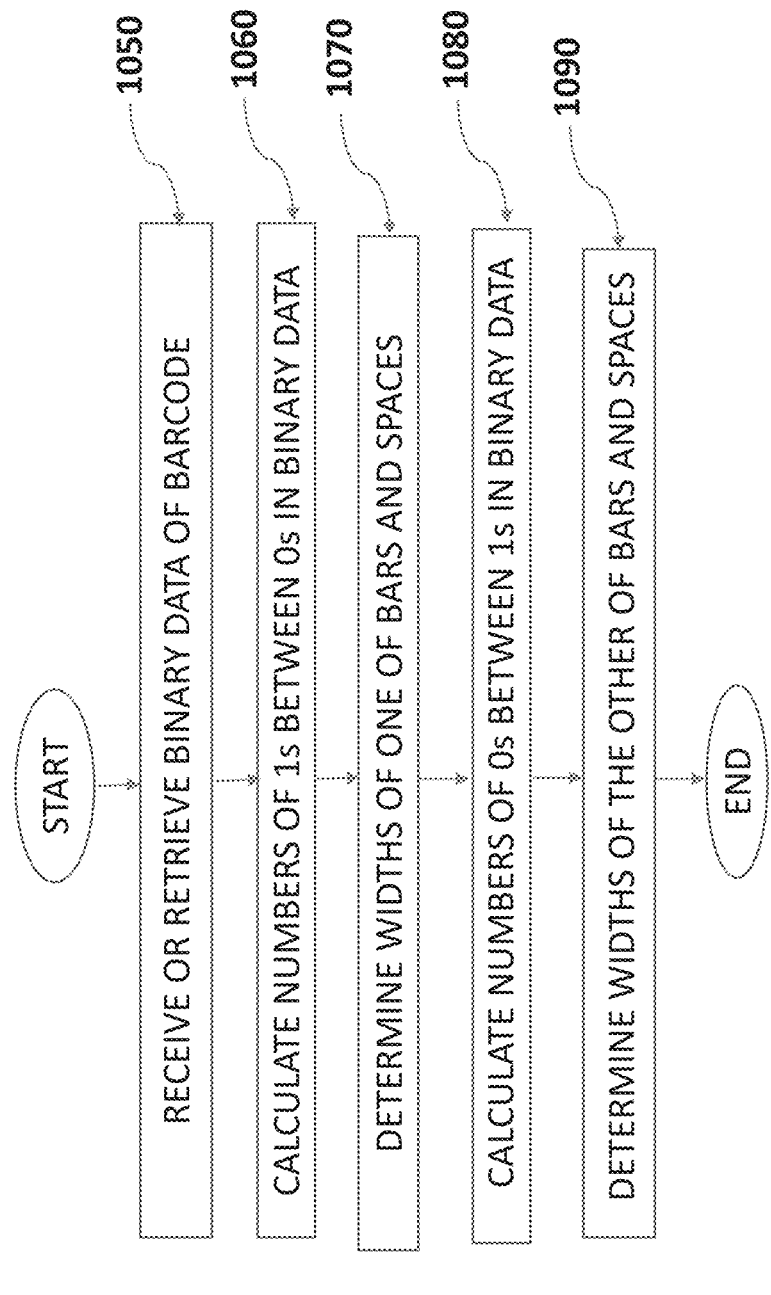
FIG. 11 is a process flow diagram of a method for reading a barcode according to some embodiments.

FIG. 11 is a process flow diagram 1000 of a method for reading a barcode according to some embodiments. In some embodiments, the process flow diagram 1000 may be performed by at least one of the optical scanner (820/925/935)

or the controller 850. In other embodiments, the process flow diagram 1000 may be performed by a computing device separate from and/or in data communication with at least one of the optical scanner (820/925/935) and the controller 850. Although the process flow diagram 1000 is described herein with reference to a particular order, in various embodiments, states herein may be performed in a different order, or omitted, and additional states may be added. This may apply to the process flow diagrams 1100, 1200 and 1300 shown in FIGS. 12-14.

In state 1050, the controller 850 may receive or retrieve binary data of the barcode data such as scanned and binarized barcode data in matrix A=(1,1,1,0,0,1,0,0,0,1,1,0,0,1, 1) as shown in FIG. 10. In state 1060, the controller 850 may calculate the numbers of is disposed between 0s in the barcode data (A), for example, using one or more of the processes described with respect to FIG. 10. In state 1070, the controller 850 may determine widths of one of 1) each of the plurality of bars and 2) each of the plurality of spaces based on the calculated numbers of 1s in the barcode data (A). In some embodiments, the widths of the bars may be determined, by calculating the numbers of 1s disposed between 0s in the barcode data (A), when 1 represents a black pixel (bar) and 0 represents a white pixel (space) as described above with respect to FIG. 10. In other embodiments, the widths of the spaces may be determined by calculating the numbers of is between 0s in the barcode data (A), when 1 represents a white pixel (space) and 0 represents a black pixel (bar) as described above with respect to FIG. 10.

In state 1080, the controller 850 may calculate the numbers of 0s disposed between is in the barcode data (A). In state 1090, the controller 850 may determine widths of the other one of 1) each of the plurality of bars and 2) each of the plurality of spaces based on the calculated numbers of is in the barcode data (A). In some embodiments, the widths of the spaces may be determined by calculating the numbers of 0s disposed between is in the barcode data (A), when 1 represents a black pixel (bar) and 0 represents a white pixel (space). In other embodiments, the widths of the bars may be determined by calculating the numbers of 0s disposed between is in the barcode data (A), when 1 represents a white pixel (space) and 0 represents a black pixel (bar).

Figure 12:
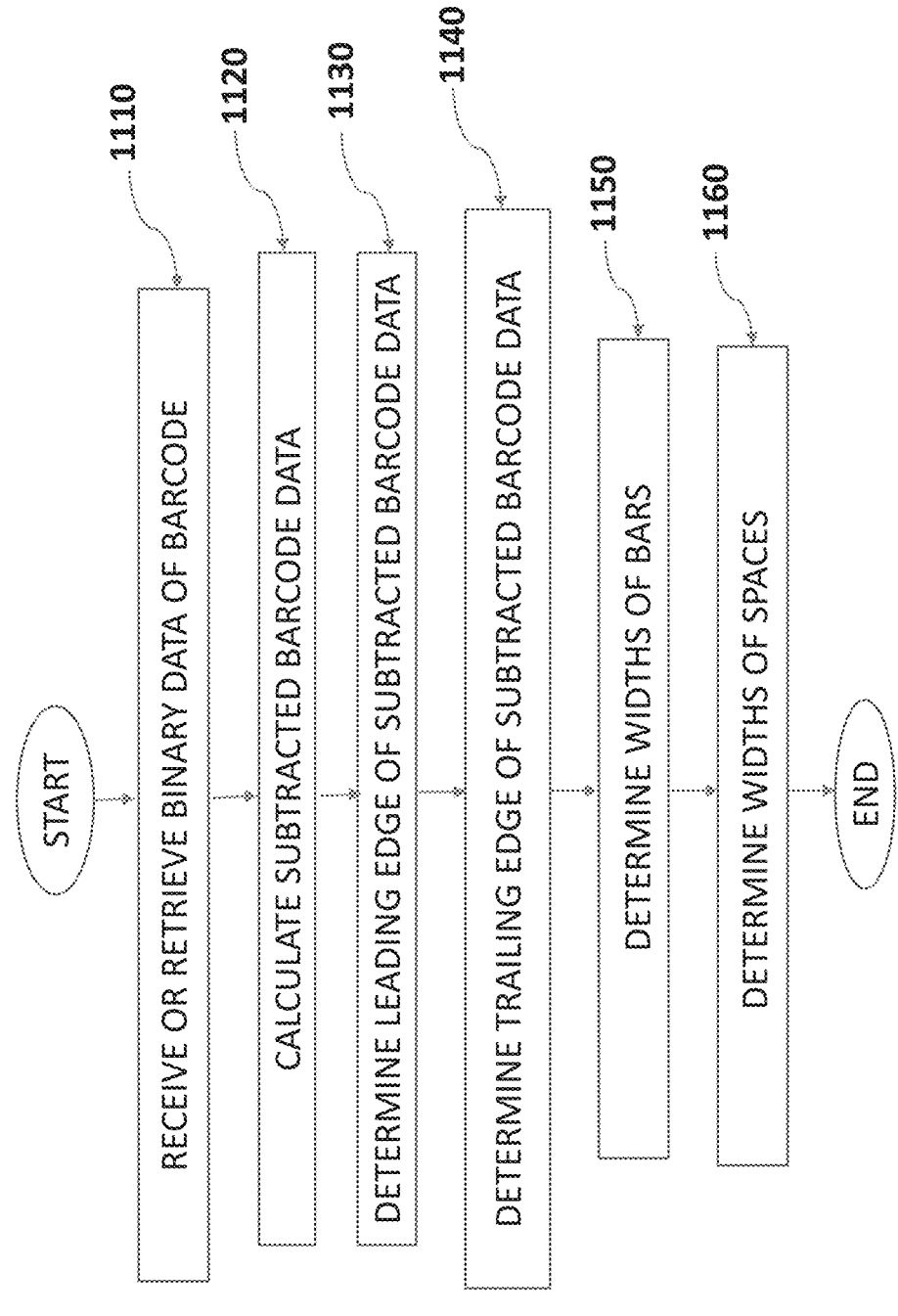
FIG. 12 is another process flow diagram of a method for reading a barcode according to some embodiments.

FIG. 12 is another process flow diagram 1100 of a method for reading a barcode according to some embodiments. For the purpose of the convenience, the description will be made based on the controller 850 performing the process flow diagram 1100.

In state 1110, the controller 850 may receive or retrieve binary data of the barcode data such as scanned and binarized barcode data (A) (1,1,1,0,0,1,0,0,0,1,1,0,0,1,1) as shown in FIG. 10. In state 1120, the controller 850 may calculate subtracted barcode data such as the subtracted set of barcode data (B) (0 0 −1 0 1 −1 0 0 1 0 −1 0 1 0), for example, using at least one of the processes described with respect to FIG. 10. In state 1130, the controller 850 may determine the leading edge of the subtracted set of barcode data (B) such as $C_1$ (5 9 13) as shown in FIG. 10, for example, using Equation 2 described above with respect to FIG. 10. In state 1140, the controller 850 may determine the trailing edge of the subtracted set of barcode data (B) such as $C_2$ (3 6 11) as shown in FIG. 10, for example, using Equation 2 described above with respect to FIG. 10. In state 1150, the controller 850 may determine the widths ($L_1$) of the bars using, for example, Equation 3 described above with respect to FIG. 10. In state 1160, the controller 850 may determine the widths ($L_2$) of the spaces, for example, using Equation 4 described above with respect to FIG. 10.

FIG. 13 is a process flow diagram 1200 of a method for scaling a barcode that has been read according to some embodiments. As discussed above, on certain embodiments, imaged black bars and white spaces can be eroded or dilated compared to their actual dimensions in the barcode. Some embodiments, as shown in FIG. 13 and FIG. 14, may calculate scaled bar and space widths and determine adjusted or compensated width values of the bars and spaces by referencing the scaled bar and space widths against predetermined values.

For the purpose of the convenience, the description will be made based on the controller 850 performing the process flow diagram 1200. In state 1210, the controller 850 may compare among calculated bar widths to determine the bar having the largest width (or widest bar). In state 1220, the controller 850 may compare among calculated space widths to determine the space having the largest width (or widest space).

In state 1230, the controller 850 may calculate bar and space width scaling factors based on, for example, a largest width specified by a predetermined barcode standard and the widest bar/space determined. For example, the controller 850 may use, as the bar width scaling factor, a ratio of a largest width specified by a predetermined barcode standard to the widest bar determined. Furthermore, the controller 850 may use, as the space width scaling factor, a ratio of the largest width specified by the predetermined barcode standard to the widest space determined. Scaled bar and space widths ($S_1$, $S_2$) can be calculated using Equations 5 and 6 described above with respect to FIG. 10. In state 1240, the controller 850 may multiply the scaling factors by the measured bar and space widths to obtain scaled bar and space widths ($S_1$, $S_2$). In state 1250, the controller 850 may determine adjusted or compensated width values of the bars and spaces, for example, by referencing the scaled bar and space widths ($S_1$, $S_2$) against corresponding values in a barcode specification's lookup table.

FIG. 14 is another process flow diagram 1300 of a method for scaling a barcode data that has been read according to some embodiments. For the purpose of the convenience, the description will be made based on the controller 850 performing the process flow diagram 1300. In state 1310, the controller 850 may compare among calculated bar widths to determine the bar having the smallest width (or narrowest bar). In state 1320, the controller 850 may compare among calculated space widths to determine the space having the smallest width (or narrowest space).

In state 1330, the controller 850 may calculate scaling factors, for example, represented as ratios of a smallest width specified by a predetermined barcode standard to the smallest bar/space determined, for example, using a method similar to that described with respect to FIG. 13. In state 1340, the controller 850 may multiply the calculated scaling factors by the determined bar and space widths to obtain the scaled bar and space widths. In state 1350, the controller 850 may determine adjusted or compensated width values by referencing the scaled bar and space widths against corresponding values in a barcode specification's lookup table as described above with respect to FIG. 13.

Figure 15:
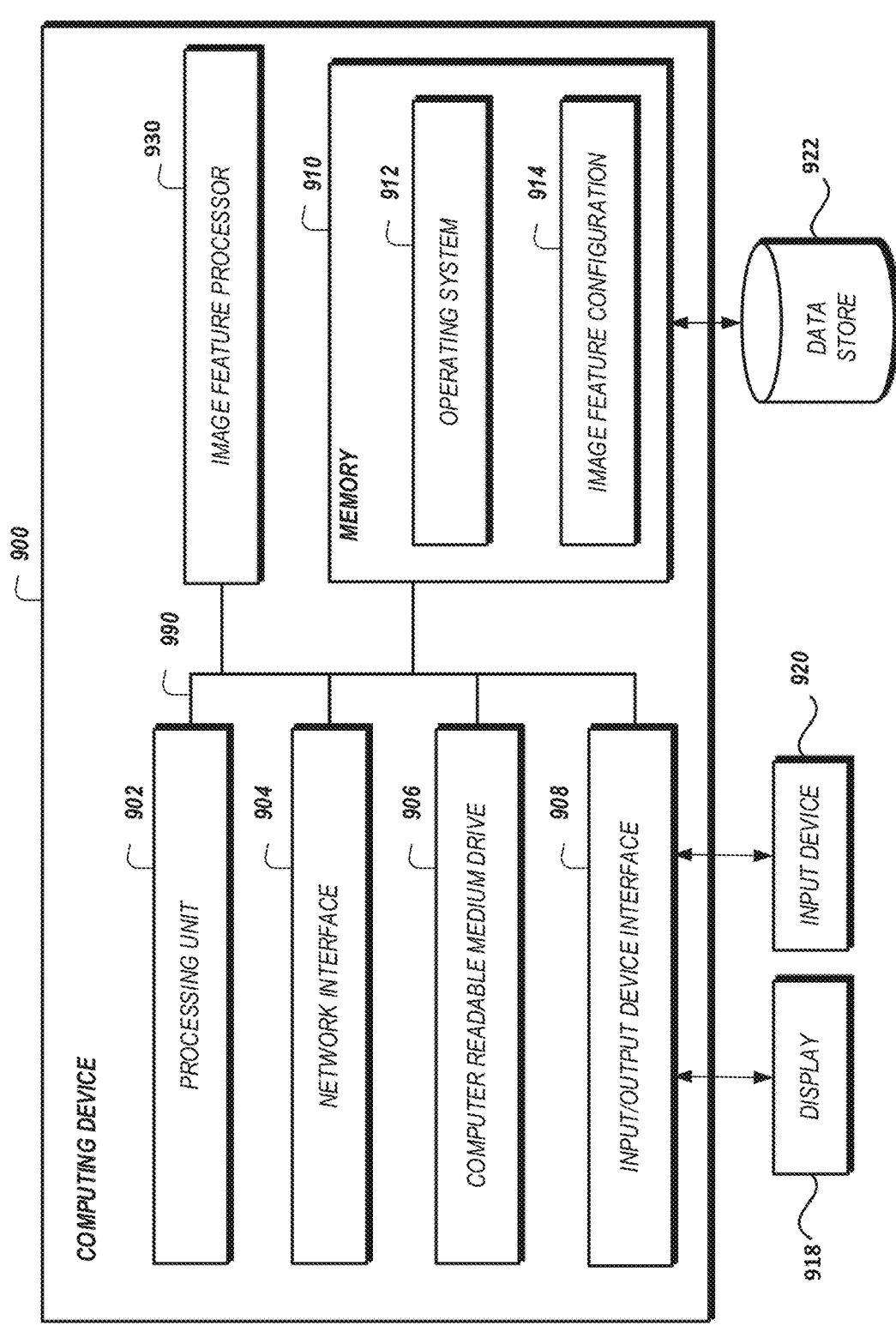
FIG. 15 is a block diagram of an example controller illustrated in FIG. 8 according to some embodiments.

FIG. 15 is a block diagram of an embodiment of a computing device 900 for implementing the barcode reading methods described above. FIG. 15 is merely an example block diagram of the computing device 900, and certain elements may be removed, other elements added, two or more elements combined or one element can be separated into multiple elements depending on the specification and requirements.

The computing device 900 can be a server or other computing device, and can include a processing unit or processor 902, an image feature processor 930, a network interface 904, a computer readable medium drive 906, an input/output device interface 908, and a memory 910. In some embodiments, the computing device 900 may implement the features of one or more of the optical scanners 820/925/935 and the controller 850. In other embodiments, at least some elements of the computing device 900 may be included in one or more of the optical scanners 820/925/935 and the controller 850 to perform an entirety or part of processes described herein. In still other embodiments, the computing device 900 may be in data communication with one or more of the optical scanners 820/925/935 and the controller 850 to perform an entirety or part of the procedures described herein.

The network interface 904 can provide connectivity to one or more networks or computing systems. The network interface 904 can receive information and instructions from other computing systems or services via the network interface 904. The network interface 904 can also store data directly to the memory 910. The processing unit 902 can communicate to and from the memory 910 and output information to an optional display 918 via the input/output device interface 908. The input/output device interface 908 can also accept input from the optional input device 920, such as a keyboard, mouse, digital pen, microphone, mass storage device, etc.

The memory 910 may contain computer program instructions that the processing unit 902 executes in order to implement one or more of the embodiments described above. The memory 910 generally includes RAM, ROM, and/or other persistent, non-transitory computer readable media. The memory 910 can store an operating system 912 that provides computer program instructions for use by the processing unit 902 or other elements included in the computing device in the general administration and operation of the computing device 900. The memory 910 can further include computer program instructions and other information for implementing aspects of the present disclosure.

For example, in one embodiment, the memory 910 includes an image feature configuration 914. The image feature configuration 914 may include one or more desired orientations for displaying different types of items, regular expressions for sets of characters including the routing information (e.g., ZIP code), area(s) of pre-printed packaging material that may include address information or other routing information, or other information supporting the image based routing of items described herein. The image feature configuration 914 may store specific values for a given configuration. The image feature configuration 914 may, in some embodiments, store information for obtaining values for a given configuration. For example, an address information extraction service implementing the regular expressions for identifying the address information or identify destination location information extracted from an image may be specified as a network location (e.g., URL) in conjunction with username and password information to access the service. In such embodiments, a message including the extracted text (or portion thereof) may be provided to the service. A response message may include the extracted address or destination location information, if available.

The memory 910 may also include or communicate with one or more auxiliary data stores, such as data store 922. The data store 922 may electronically store data regarding mail pieces, image files, or finalization results therefore.

The elements included in the computing device 900 may be coupled by a bus 990. The bus 990 may be a data bus, communication bus, or other bus mechanism to enable the various components of the computing device 900 to exchange information.

In some embodiments, the computing device 900 may include additional or fewer components than are shown in FIG. 15. For example, a computing device 900 may include more than one processing unit 902 and computer readable medium drive 906. In another example, the computing device 900 may not be coupled to a display 918 or an input device 920. In some embodiments, two or more computing devices 900 may together form a computer system for executing features of the present disclosure.

In some embodiments, a non-transitory computer readable medium having stored thereon instructions which when executed by at least one computing device performs all or a portion of the methods described.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image processing system can be or include a microprocessor, but in the alternative, the image processing system can be or include a controller, microcontroller, or state machine, combinations of the same, or the like configured to generate and analyze indicator feedback. An image processing system can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EE-PROM), registers, hard disk, a removable disk, a compact disc read-only memory (CD-ROM), or other form of a non-transitory computer-readable storage medium. An exemplary storage medium can be coupled to the image processing system such that the image processing system can read information from, and write information to, the storage medium. In the alternative, the storage medium can be integral to the image processing system. The image processing system and the storage medium can reside in an application specific integrated circuit (ASIC). The ASIC can reside in an access device or other monitoring device. In the alternative, the image processing system and the storage medium can reside as discrete components in an access device or other item processing device. In some embodiments, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for processing an image of a computer readable code positioned on distribution item, the system comprising:

one or more processors configured to:

obtain, via a scanning device on item processing equipment, a scanned image of the computer readable code;

determine, in the scanned image of the computer readable code, a plurality of first pixel values and a plurality of second pixel values, wherein each of the plurality of first pixel values represents a first pixel corresponding to a first component of the computer readable code and each of the plurality of second pixel values represents a second component of the computer readable code;

determine a relative size of the first component of the computer readable code based on the plurality of first pixel values;

determine a relative size of the second component of the computer readable code based on the plurality of second pixel values; and determine adjusted size values of the first component and the second component of the computer readable code based on a scaling factor applied to the relative sizes of the first component and the second component of the computer readable code.

2. The system of claim 1, wherein the processor is further configured to execute the instructions to:

identify a first edge of the computer readable code, the first edge representing positions in a sequence of the digital data corresponding to the first component; and identify a second edge of the computer readable code, the second edge representing positions in the sequence of the digital data corresponding to the second component.

3. The system of claim 1, wherein the one or more processors are further configured to determine where a string of first pixel values transitions to a string of second pixel values.

4. The system of claim 1, wherein one or more processors are further configured to determine where a string of second pixel values transition to a string of first pixel values in.

5. The system of claim 1, wherein the first component is a plurality of bars, and the second component is a plurality of spaces, and wherein one or more processors are further configured to:

compare relative sizes of the plurality of bars to identify a widest bar;

compare relative sizes of the plurality of spaces to identify a widest space;

calculate the scaling factor based on a largest width specified by a predetermined computer readable code standard and the widest bar determined;

calculate the space width scaling factor based on the largest width specified by the predetermined computer readable code standard and the widest space determined;

multiply the calculated scaling factors respectively by a width of the widest bar and a width of the widest space to obtain scaled bar and space widths; and determine the adjusted width values of the plurality of bars and the plurality of spaces by referencing the scaled bar widths and scaled space widths against corresponding values of a predetermined computer readable code specification stored in a memory.

6. The system of claim 1, wherein the one or more processors are further configured to identify a first edge of the computer readable code, by calculating numbers of first pixel values arranged relative to the second pixel values.

7. The system of claim 1, wherein the one or more processors are further configured to identifying a second edge of the computer readable code, by calculating numbers of second pixel values arranged relative to the first pixel values.

8. The system of claim 1, wherein the processors are further configured to:

convert the scanned image to binary data, wherein the first pixel values correspond to a lower digit binary value and the second pixel values correspond to a higher digit binary value;

subtract the lower digit binary value of the binary data (A) from an adjacent higher digit binary value of the binary data (A) throughout the plurality of binary digits;

determine a subtracted set of the computer readable code data (B);

select a first set of digit values ($C_1$) having a positive digit difference from the subtracted set of the computer readable code data (B);

select a second set of digit values ($C_2$) having a negative digit difference from the subtracted set of the computer readable code data (B); and determine relative widths ($L_1$) of the plurality of bars and relative widths ($L_2$) of the plurality of spaces based on the first and second sets of digit values ($C_1$, $C_2$).

9. The system of claim 8, wherein the plurality of binary digits of the binary data (A) comprise a plurality of ones (1s) each representing a bar and a plurality of zeros (0s) each representing a space, wherein the binary data (A) is represented by a matrix of A ($\hat{\imath}, \hat{\jmath}$), and wherein the subtracted set of the computer readable code data (B) comprises 1, 0, −1 and is determined using the equation B=A ($2 \leq \hat{\jmath} \leq n_A$)−A ($1 \leq \hat{\jmath} \leq n_A - 1$) where a dimension of B is $1 \times n_B$ and $n_B = n_A - 1$.

10. The system of claim 9, wherein the processor is further configured to select the first and second sets of digit values ($C_1$, $C_2$) using Equation 2 below:

$$C_1 = \hat{\jmath}_B(B = 1) \text{ with a dimension } n_{C1} = \sum(B = 1) \text{ and} \qquad \text{Equation 2}$$
$$C_2 = \hat{\jmath}_B(B = -1) \text{ with a dimension } n_{C2} = \sum(B = -1).$$

11. A method for processing an image of a computer readable code positioned on distribution item, the method comprising:

obtaining, via a scanning device on item processing equipment, a scanned image of the computer readable code;

determining, in the scanned image of the computer readable code, a plurality of first pixel values and a plurality of second pixel values, wherein each of the plurality of first pixel values represents a first pixel corresponding to a first component of the computer readable code and each of the plurality of second pixel values represents a second component of the computer readable code;

determining a relative size of the first component of the computer readable code based on the plurality of first pixel values;

determining a relative size of the second component of the computer readable code based on the plurality of second pixel values; and determining adjusted size values of the first component and the second component of the computer readable code based on a scaling factor applied to the relative sizes of the first component and the second component of the computer readable code.

12. The method of claim 11, further comprising:

identifying a first edge of the computer readable code, the first edge representing positions in a sequence of the digital data corresponding to the first component; and identifying a second edge of the computer readable code, the second edge representing positions in the sequence of the digital data corresponding to the second component.

13. The method of claim 11, further comprising determining where a string of first pixel values transitions to a string of second pixel values.

14. The method of claim 11, further comprising determining where a string of second pixel values transition to a string of first pixel values.

15. The method of claim 11, wherein the first component is a plurality of bars, and the second component is a plurality of spaces, and wherein the method further comprises:

comparing relative sizes of the plurality of bars to identify a widest bar;

comparing relative sizes of the plurality of spaces to identify a widest space;

calculating the scaling factor based on a largest width specified by a predetermined computer readable code standard and the widest bar determined;

calculating the space width scaling factor based on the largest width specified by the predetermined computer readable code standard and the widest space determined;

multiplying the calculated scaling factors respectively by a width of the widest bar and a width of the widest space to obtain scaled bar and space widths; and determining the adjusted width values of the plurality of bars and the plurality of spaces by referencing the scaled bar widths and scaled space widths against corresponding values of a predetermined computer readable code specification stored in a memory.

16. The method of claim 11, further comprising identifying a first edge of the computer readable code by calculating numbers of first pixel values arranged relative to the second pixel values.

17. The method of claim 11, further comprising identifying a second edge of the computer readable code by calculating numbers of second pixel values arranged relative to the first pixel values.

18. The method of claim 11, further comprising:

converting the scanned image to binary data, wherein the first pixel values correspond to a lower digit binary value and the second pixel values correspond to a higher digit binary value;

subtracting the lower digit binary value of the binary data (A) from an adjacent higher digit binary value of the binary data (A) throughout the plurality of binary digits;

determining a subtracted set of the computer readable code data (B);

selecting a first set of digit values ($C_1$) having a positive digit difference from the subtracted set of the computer readable code data (B);

selecting a second set of digit values ($C_2$) having a negative digit difference from the subtracted set of the computer readable code data (B); and determining relative widths ($L_1$) of the plurality of bars and relative widths ($L_2$) of the plurality of spaces based on the first and second sets of digit values ($C_1$, $C_2$).

19. The method of claim 18, wherein the plurality of binary digits of the binary data (A) comprise a plurality of ones (1s) each representing a bar and a plurality of zeros (0s) each representing a space, wherein the binary data (A) is represented by a matrix of A ($\hat{\imath}$, $\hat{\jmath}$), and wherein the subtracted set of the computer readable code data (B) comprises 1, 0, $-1$ and is determined using the equation $B=A(2\le\hat{\jmath}\le n_A)-A(1\le\hat{\jmath}\le n_A-1)$ where a dimension of B is $1\times n_B$ and $n_B=n_A-1$.

20. A method for processing an image of a computer readable code positioned on a distribution item, the method comprising:

obtaining, at a processor, a scanned image of the computer readable code including a plurality of bars and a plurality of spaces alternately disposed with respect to the plurality of bars;

converting, at a processor, the scanned image into digital data including a plurality of first pixel values and a plurality of second pixel values, wherein each of the plurality of first pixel values represents a first pixel corresponding to a bar of the computer readable code and each of the plurality of second pixel values represents a second pixel corresponding to a space of the computer readable code;

calculating, at a processor, numbers of first pixel values disposed between second pixel values in the digital data;

determining, at a processor, relative widths of one of i) each of the plurality of bars and ii) each of the plurality of spaces based on the numbers of first pixel values;

calculating, at a processor, numbers of second pixel values disposed between first pixel values in the digital data;

determining, at a processor, relative widths of the other one of i) each of the plurality of bars and ii) each of the plurality of spaces based on the numbers of second pixel values; and determining, at a processor, adjusted width values of the bars and spaces based at least in part on a bar width scaling factor and a space width scaling factor applied to the relative widths of the bars and spaces.

* * * * *